United States Patent
Masuji et al.

(10) Patent No.: US 7,110,010 B1
(45) Date of Patent: Sep. 19, 2006

(54) APPARATUS AND METHOD OF VIDEO SIGNAL PROCESSING FOR MATRIX DISPLAY APPARATUS

(75) Inventors: Shigehiro Masuji, Toride (JP); Hideki Aiba, Iwai (JP)

(73) Assignee: Victor Company of Japan, Ltd., Kanagawa-Ken (JP)

( * ) Notice: Subject to any disclaimer, the term of this patent is extended or adjusted under 35 U.S.C. 154(b) by 0 days.

(21) Appl. No.: 09/417,016

(22) Filed: Oct. 12, 1999

(30) Foreign Application Priority Data

| Oct. 12, 1998 | (JP) | ................................ 10/289143 |
| Nov. 6, 1998 | (JP) | ................................ 10/315743 |
| Nov. 11, 1998 | (JP) | ................................ 10/320283 |
| Nov. 26, 1998 | (JP) | ................................ 10/335478 |

(51) Int. Cl.
*G09G 3/34* (2006.01)
(52) U.S. Cl. ...................................... 345/692; 345/698
(58) Field of Classification Search ................ 345/690, 345/87–88, 89, 204, 596, 597–599, 589, 345/63, 691–693, 694, 698; 348/714–715, 348/716, 574; 358/455, 457, 3.13–3.19, 358/1.9, 3.01, 3.03
See application file for complete search history.

(56) References Cited

U.S. PATENT DOCUMENTS

| 5,144,456 A | * | 9/1992 | Sakano ........................ 358/443 |
| 5,495,346 A | * | 2/1996 | Choi et al. .................. 358/3.13 |
| 5,555,102 A | | 9/1996 | Dalton ........................ 358/456 |
| 5,596,349 A | * | 1/1997 | Kobayashi et al. .......... 345/147 |
| 5,640,249 A | * | 6/1997 | Rao et al. ..................... 358/3.1 |

(Continued)

FOREIGN PATENT DOCUMENTS

EP 0545577 A2 6/1993

(Continued)

*Primary Examiner*—Richard Hjerpe
*Assistant Examiner*—Jean Lesperance
(74) *Attorney, Agent, or Firm*—Jacobson Holman PLLC

(57) ABSTRACT

A video signal is processed using dither coefficients. Dither coefficients pattern signals are generated. Each pattern signal carries positive and negative dither coefficients arranged in an (n×m) matrix where "n" and "m" being positive integers larger than zero, the sum total of the coefficients being zero. One of the pattern signal is selected for each predetermined unit of picture carried by the video signal. Or, it is selected according to locations of dither coefficients on pixels arranged on a display panel. Dither coefficients of the selected pattern signal are added to an input video signal, thus outputting a video signal to be supplied to the display panel. Instead of the dither coefficients pattern signals, dither pattern signals can be generated, each carrying positional data indicating locations of dither coefficients on the pixels on the display panel. A dither coefficient signal to be added to the input signal is generated which carries the dither coefficients arranged in a matrix for each gradation level of the input video signal in response to one of the dither pattern signal. Dither coefficients pattern signals can be generated according to color gradation levels of data carried by the input video signal, the data being supplied to each of dot matrices that constitute the pixels, each pattern signal carrying dither coefficients arranged in a matrix corresponding to each dot matrix. One of dither coefficients is selected from each pattern signal with respect to each dot matrix, thus outputting a dither coefficients pattern signal that carries the dither coefficients selected from the pattern signals and arranged in the matrix. The dither coefficients carried by the output pattern signal to be added to the input video signal are adjusted so that the sum total of the dither coefficients carried by the output pattern signal is zero.

11 Claims, 24 Drawing Sheets

U.S. PATENT DOCUMENTS

| | | | |
|---|---|---|---|
| 5,712,651 A * | 1/1998 | Tomiyasu | 345/88 |
| 5,712,657 A | 1/1998 | Eglit et al. | 345/147 |
| 5,714,974 A | 2/1998 | Liu | 345/149 |
| 5,734,369 A * | 3/1998 | Priem et al. | 345/605 |
| 5,751,920 A | 5/1998 | Dalton | 395/109 |
| 5,805,126 A | 9/1998 | Bassetti | 345/89 |
| 5,905,504 A * | 5/1999 | Barkans et al. | 345/597 |
| 6,008,793 A * | 12/1999 | Shigeta | 345/204 |
| 6,008,794 A * | 12/1999 | Ishii | 345/598 |
| 6,069,609 A * | 5/2000 | Ishida et al. | 345/596 |
| 6,084,560 A * | 7/2000 | Miyamoto | 345/89 |
| 6,091,398 A * | 7/2000 | Shigeta | 345/204 |

FOREIGN PATENT DOCUMENTS

| | | |
|---|---|---|
| EP | 0677950 A1 | 10/1995 |
| JP | 08-146908 | 6/1996 |
| JP | 10098663 | 4/1998 |
| JP | 2000-056726 | 2/2000 |

* cited by examiner

FIG. 11

(A) GRADATION 0~15:

$$\begin{array}{|c|c|} \hline a & b \\ \hline c & d \\ \hline \end{array} , \begin{array}{|c|c|} \hline d & c \\ \hline b & a \\ \hline \end{array} = \begin{array}{|c|c|} \hline 5 & 3 \\ \hline -3 & -5 \\ \hline \end{array} , \begin{array}{|c|c|} \hline -5 & -3 \\ \hline 3 & 5 \\ \hline \end{array}$$

(B) GRADATION 16~31:

$$\begin{array}{|c|c|} \hline a & b \\ \hline c & d \\ \hline \end{array} , \begin{array}{|c|c|} \hline d & c \\ \hline b & a \\ \hline \end{array} = \begin{array}{|c|c|} \hline 4 & 2 \\ \hline -2 & -4 \\ \hline \end{array} , \begin{array}{|c|c|} \hline -4 & -2 \\ \hline 2 & 4 \\ \hline \end{array}$$

(C) GRADATION 32~47:

$$\begin{array}{|c|c|} \hline a & b \\ \hline c & d \\ \hline \end{array} , \begin{array}{|c|c|} \hline d & c \\ \hline b & a \\ \hline \end{array} = \begin{array}{|c|c|} \hline 3 & 1 \\ \hline -1 & -3 \\ \hline \end{array} , \begin{array}{|c|c|} \hline -3 & -1 \\ \hline 1 & 3 \\ \hline \end{array}$$

(D) GRADATION 48~63:

$$\begin{array}{|c|c|} \hline a & b \\ \hline c & d \\ \hline \end{array} , \begin{array}{|c|c|} \hline d & c \\ \hline b & a \\ \hline \end{array} = \begin{array}{|c|c|} \hline 2 & 1 \\ \hline -1 & -2 \\ \hline \end{array} , \begin{array}{|c|c|} \hline -2 & -1 \\ \hline 1 & 2 \\ \hline \end{array}$$

(A) GRADATION 0~15:  $\begin{vmatrix} 5 & 3 \\ -3 & -5 \end{vmatrix} = \begin{vmatrix} a & b \\ c & d \end{vmatrix}$ (B) GRADATION 16~31: $\begin{vmatrix} 4 & 2 \\ -2 & -4 \end{vmatrix} = \begin{vmatrix} a & b \\ c & d \end{vmatrix}$ (C) GRADATION 32~47: $\begin{vmatrix} 3 & 1 \\ -1 & -3 \end{vmatrix} = \begin{vmatrix} a & b \\ c & d \end{vmatrix}$ (D) GRADATION 48~63: $\begin{vmatrix} 2 & 1 \\ -1 & -2 \end{vmatrix} = \begin{vmatrix} a & b \\ c & d \end{vmatrix}$

(A) GRADATION 0~15:

| a | b |
|---|---|
| c | d |

| 5 | 3 |
|---|---|
| -3 | -5 |

→

| -5 | -3 |
|---|---|
| 3 | 5 |

(B) GRADATION 16~31:

| a | b |
|---|---|
| c | d |

| 4 | 2 |
|---|---|
| -2 | -4 |

→

| -4 | -2 |
|---|---|
| 2 | 4 |

(C) GRADATION 32~47:

| a | b |
|---|---|
| c | d |

| 3 | 1 |
|---|---|
| -1 | -3 |

→

| -3 | -1 |
|---|---|
| 1 | 3 |

(D) GRADATION 48~63:

| a | b |
|---|---|
| c | d |

| 2 | 1 |
|---|---|
| -1 | -2 |

→

| -2 | -1 |
|---|---|
| 1 | 2 |

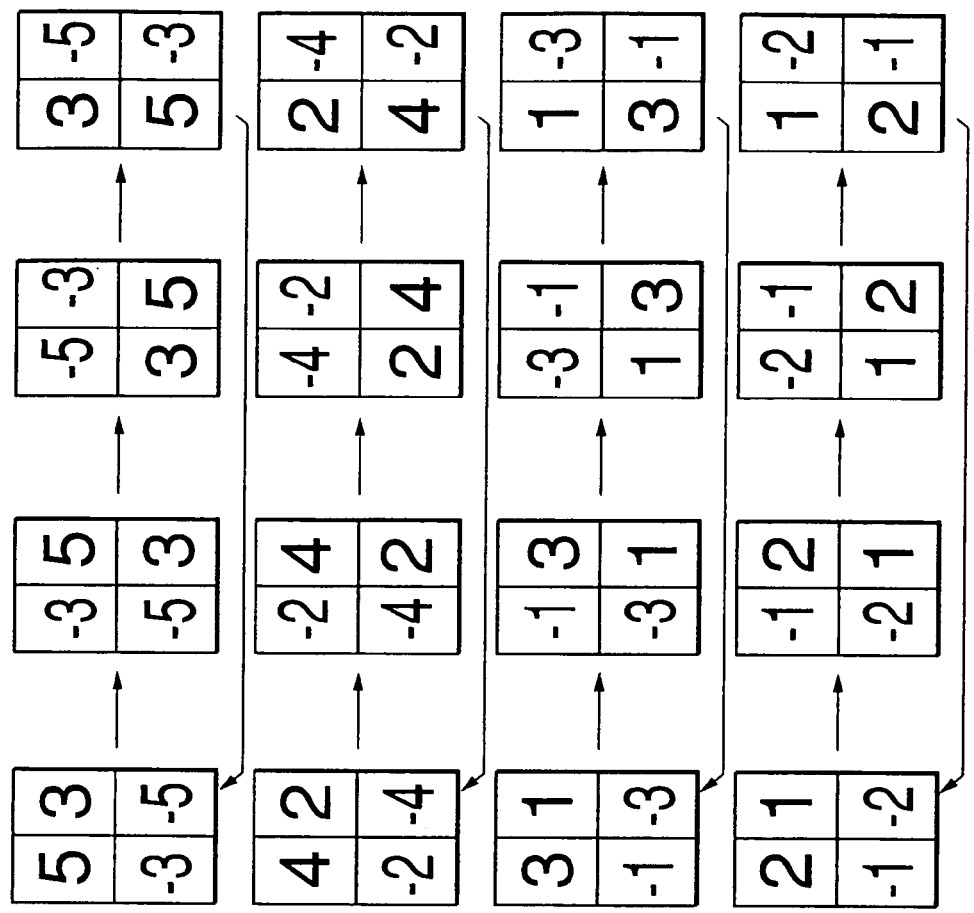
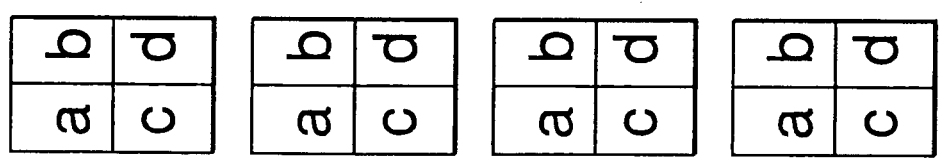
(A) GRADATION 0~15:
(B) GRADATION 16~31:
(C) GRADATION 32~47:
(D) GRADATION 48~63:
FIG.20

APPARATUS AND METHOD OF VIDEO SIGNAL PROCESSING FOR MATRIX DISPLAY APPARATUS

BACKGROUND OF THE INVENTION

The present invention relates to an apparatus and a method of video signal processing. Particularly, this invention relates to an apparatus and a method of video signal processing for matrix display apparatus, such as, plasm display panels (PDPs), field emission displays (FEDs), digital micromirror devices (DMDs) and electroluminescent displays (ELs).

Pictures are displayed on PDPs, ELs and FEDs at a particular number of levels of gradation of color. The number is limited under digital processing for PDPs that display pictures with division of one field to sub-fields, and ELs and FEDS that display pictures with pulse width modulation (PWM).

PDPs, ELs and FEDs require reverse-gamma correction of video signals that have undergone gamma correction for regaining linear gradation.

Matrix display apparatus execute multi-gradation processing using dither matrices for achieving continuous gradation that would be degraded due to digital reverse-gamma correction.

Multi-gradation processing use dither matrices each having groups of adjacent pixel dots to provide intermediate gradation of the gradation that would otherwise be degraded due to reverse-gamma correction.

Six bit-gradation display apparatus display pictures with upper significant six bits of 8-bit dot data by means of dither matrices each having adjacent 2×2 dots on which a noise pattern is superimposed for the low significant two bits that will overflow in each dither matrix. These processing provide pictures with 8-bit gradation under visual integration.

Illustrated in FIG. 1 are well known dither coefficients matrix patterns. Shown here are dither coefficients patterns, each of which has a matrix of 2×2 dots (a, b, c and d). Each dot corresponds to one pixel of red (R), green (G) and blue (B).

The dither coefficients patterns are added to video signals for dot data on a display panel, such as a PDP. In detail, dither coefficients (a, b, a, b, . . . ) and (c, d, c, d, . . . ) are added to luminance values of R, G, and B of dot data on odd and even lines, respectively, of a dot matrix on the PDP. The addition starts from the head dot on each odd or even line. Furthermore, the dither coefficients (a, b, c and d) are added to the video signals for four adjacent dots of the same color for each of R, G and B.

Illustrated in (A) of FIG. 1 are two dither coefficients patterns (1) and (2) where the coefficients for the pattern (a, b, c, and d) are (0, 1, 2, and 3) and (3, 2, 1 and 0), respectively. The two patterns are switched for each field.

Illustrated in (B) of FIG. 1 are four dither coefficients patterns (1) to (4) where the coefficients for the patterns (a, b, c, and d) are (0, 1, 2, and 3), (2, 0, 3 and 1), (3, 2, 1, and 0) and (1, 3, 0 and 2), respectively. The four patterns are switched cyclically for each field.

Illustrated in FIG. 2 is video signal processing using the two dither coefficients patterns (1) and (2) shown in (A) of FIG. 1.

In detail, the dither coefficients (0, 1, 2, and 3) of the pattern (1) are added to dot data (9, 17, 3 and 5) of an input 8-bit video signal shown in (A) of FIG. 2 to obtain data (9, 18, 5 and 8).

The values (9, 18, 5 and 8) are larger than the 8-bit values (9, 17, 3 and 5) of the input video signal. The values (9, 18, 5 and 8) are then processed by limiting the values that overflow the input 8-bit values and also dropping the values of lower two bits to obtain a 6-bit output video signal of data (8, 16, 4 and 8).

Each data of (8, 16, 4 and 8) is expressed with a multiple number of four. The actual data for the 6-bit output video signal are (2, 4, 1 and 2). The 6-bit output video signal is a multi-gradation signal for which the number of gradation levels appear to be increased to eight bits for 6-bit PDPs with the dither coefficients pattern (1).

The data (9, 18, 5 and 8) may be processed by limiting the values that overflow the input 8-bit values (9, 17, 3 and 5) for 8-bit PDPs to provide 10-bit multi-gradation without dropping low tow-bit values.

Next, the dither coefficients (3, 2, 1, and 0) of the pattern (2) are added to dot data (9, 17, 3 and 5) of an input 8-bit video signal shown in (B) of FIG. 2 to obtain data (12, 19, 4 and 5).

The values (12, 19, 4 and 5) are also larger than the 8-bit values (9, 17, 3 and 5) of the input video signal. The values (12, 19, 4 and 5) are processed by limiting the values that overflow the input 8-bit values and dropping the values of lower two bits to obtain a 6-bit output video signal of data (12, 16, 4 and 4).

Each of the data (12, 16, 4 and 4) is also expressed with a multiple number of four. The actual data for the 6-bit output video signal are (3, 4, 1 and 1). The 6-bit output video signal is a multi-gradation signal for which the number of gradation levels appear to be increased to eight bits for 6-bit PDPs with the dither coefficients pattern (2).

The output video signals shown in (A) and (B) of FIG. 2 are switched for each field.

Video signal processing using the dither coefficients patterns (1) to (4) shown in (B) of FIG. 1 are basically the same as those discussed above with reference to FIG. 2. The dither coefficients patterns (1) to (4) are switched cyclically for each field to provide multi-gradation spatially continuous than those provided by the dither coefficients patterns (1) and (2) shown in (A) of FIG. 1.

Video signals undergo digital reverse-gamma correction to provide linear gradation before being supplied to display apparatus such as PDPs. The reverse-gamma correction decreases the number of gradation levels at low luminance level to cause uncontinuous gradation, thus resulting degradation of pictures.

PDPs provides gradation of color by constituting one field with sub-fields with different luminance weighting and selecting some of the sub-fields. The sub-field selection sometimes causes differences in visual luminance between adjacent gradations. This results in degradation of still and moving pictures with pseudo edges generated on pictures.

The dither coefficients patterns discussed above are employed for pictures of liner gradation which would otherwise be degraded due to generation of pseudo edges on pictures. The dither coefficients patterns shown in FIG. 1 are however applied for all the gradations with the same dither coefficients.

These dither coefficients patterns contribute degradation of pictures with pseudo edges due to a big luminance difference between adjacent gradations for which the dither coefficients give a big difference in the number of sub-fields selected at intermediate to high luminance levels.

Degradation of gradation due to digital reverse-gamma correction differs over low to high luminance levels. There is a big difference in such degradation particularly at the low luminance level.

The dither coefficients patterns shown in FIG. 1 are applied for all the gradations with the same dither coefficients as discussed above. This results in continuity only for a part of gradations on pictures.

SUMMARY OF THE INVENTION

A purpose of the present invention is to provide an apparatus and a method of video signal processing for matrix display apparatus that improve continuity for all the gradations with extremely less generation of noises, such as pseudo edges on pictures.

The present invention provides an apparatus for processing a video signal.

The apparatus includes a generator to generate at least one dither coefficients pattern signal, the pattern signal carrying positive and negative dither coefficients arranged in an (n×m) matrix where "n" and "m" being positive integers larger than zero, the sum total of the coefficients being zero; and an adder to add the dither coefficients of the pattern signal to an input video signal, thus outputting a video signal.

The present invention further provides an apparatus for processing a video signal.

The apparatus includes a pattern generator to generate a plurality of dither pattern signals, each pattern signal carrying positional data indicating locations of dither coefficients on pixels arranged in a matrix on a display panel; a coefficient generator to generate a dither coefficient signal carrying the dither coefficients arranged in a matrix for each gradation level of an input video signal in response to one of the pattern signal; and an adder to add the coefficient signal to the input video signal, thus outputting a video signal to be supplied to the display panel.

The present invention still provides an apparatus for processing a video signal.

The apparatus includes a generator to generate a plurality of dither coefficient signals, each coefficient signal carrying dither coefficients arranged in a matrix; a detector to detect color gradation levels of an input video signal; and an adder to add one of the coefficient signals to signal components at predetermined gradation levels of the input video signal, thus outputting a video signal.

The present invention also provides an apparatus for processing a video signal.

The apparatus includes a coefficient generator to generate a plurality of dither coefficients pattern signals according to color gradation levels of data carried by an input video signal, the data being supplied to each of dot matrices that constitute pixels on a display panel, each pattern signal carrying dither coefficients arranged in a matrix corresponding to each dot matrix; a selector to select one of dither coefficients from each pattern signal with respect to each dot matrix, thus outputting a dither coefficients pattern signal that carries the dither coefficients selected from the pattern signals and arranged in the matrix; an adjuster to adjust the dither coefficients carried by the output pattern signal so that the sum total of the dither coefficients carried by the output pattern signal is zero; and an adder to add the dither coefficient-adjusted pattern signal to the input video signal, thus outputting a video signal carrying the data to be supplied to the display panel.

Furthermore, the present invention provides a method of processing a video signal.

At least one dither coefficients pattern signal is generated, the pattern signal carrying positive and negative dither coefficients arranged in an (n×m) matrix where "n" and "m" being positive integers larger than zero, the sum total of the coefficients being zero. The dither coefficients of the pattern signal is added to an input video signal, thus outputting a video signal.

Moreover, the present invention provides a method of processing a video signal.

A plurality of dither pattern signals are generated, each pattern signal carrying positional data related to pixels arranged in a matrix on a display panel. A dither coefficient signal is generated which carries the dither coefficients arranged in a matrix for each gradation level of an input video signal in response to one of the pattern signal. And, the dither coefficient signal is added to the input video signal, thus outputting a video signal to be supplied to the display panel.

The present invention still provides a method of processing a video signal.

A plurality of dither coefficients pattern signals are generated according to color gradation levels of data carried by an input video signal, the data being supplied to each of dot matrices that constitute pixels on a display panel, each pattern signal carrying dither coefficients arranged in a matrix corresponding to each dot matrix. One of dither coefficients is selected from each pattern signal with respect to each dot matrix, thus outputting a dither coefficients pattern signal that carries the dither coefficients selected from the pattern signals and arranged in the matrix. The dither coefficients carried by the output pattern signal are adjusted so that the sum total of the dither coefficients carried by the output pattern signal is zero. And, the dither coefficient-adjusted pattern signal is added to the input video signal, thus outputting a video signal to be supplied to the display panel.

BRIEF DESCRIPTION OF DRAWINGS

FIG. 11 illustrates dither coefficients decided for each gradation groups using the dither patterns shown in FIG. 10;

FIG. 18 illustrates dither coefficients patterns used in the third embodiment;

FIG. 19 illustrates switching of two dither coefficients patterns at respective gradation levels in the third embodiment;

FIG. 20 illustrates switching of four dither coefficients patterns at respective gradation levels in the third embodiment;

DETAILED DESCRIPTION OF PREFERRED EMBODIMENTS

Preferred embodiments according to the present invention will be described with reference to the attached drawings.

Figure 3:
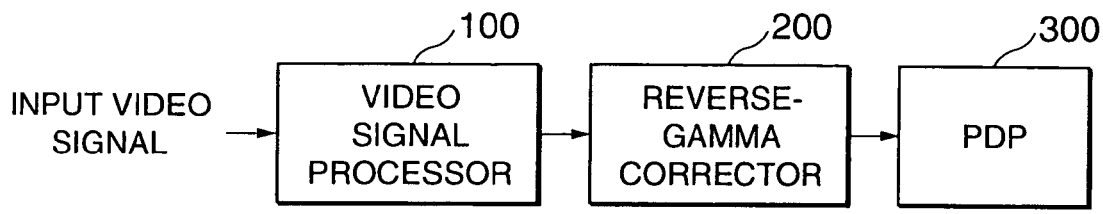
FIG. 3 shows a block diagram of the overall configuration of a video signal processing system with a video signal processing apparatus according to the present invention.

Shown in FIG. 3 is a block diagram of the overall configuration of a video signal processing system with a video signal processing apparatus or processor according to the present invention.

An input video signal is supplied to a video signal processor 100. The video signal undergoes a processing for achieving multi-gradation with dither coefficients patterns which will be described later. The video signal is then supplied to a reverse-gamma corrector 200 for digital reverse-gamma correction, and is supplied to a matrix display apparatus 300, such as a PDP. Although not shown, three sets of the video signal processors 100 and reverse-gamma correctors 200 are required for R-, G- and B-video signals. The reverse-gamma correction may be executed simultaneously with or before the multi-gradation processing.

Figure 4:
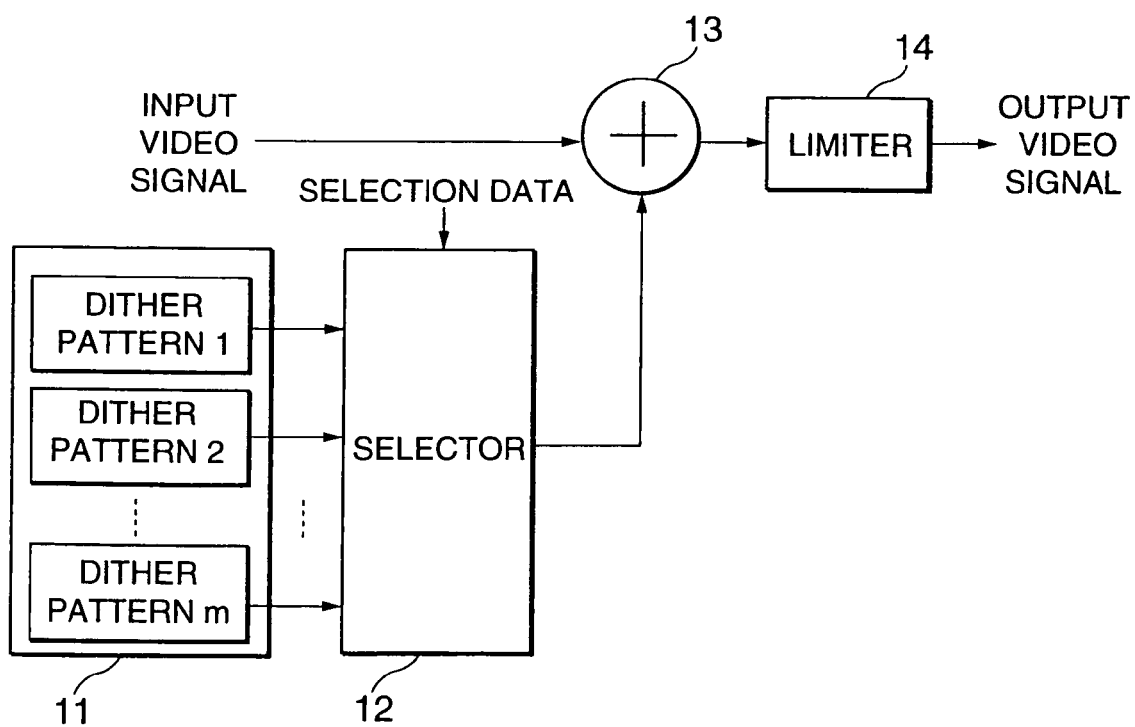
FIG. 4 shows a block diagram of the first preferred embodiment of a video signal processor according to the present invention.

Shown in FIG. 4 is a block diagram of the first embodiment of a video signal processor according to the present invention, which can be employed as the video processor 100 shown in FIG. 3.

A dither matrix coefficients generator 11 generates a plurality of (n×n) dot matrix dither coefficients patterns. Illustrated are an "m" number of dither coefficients patterns. The number "m" is an integer of two or more. The generator 11 may include ROMs for storing the dither coefficients patterns. Or, such patterns can be programmed as software.

One of the dither coefficients patterns is selected by a selector 12 and supplied to an adder 13. The pattern selection is performed according to selection data supplied to the selector 12. The selection data is time data or positional data on a display panel of the PDP 300 (FIG. 3). The time data is, for example, field data, that indicates the timing of selecting the patterns for each field, a predetermined unit of picture, carried by the video signal. The positional data is, for example, scanning line data or pixel data, both indicating the locations of the pixels on the display panel. These data are generated from horizontal and vertical synchronizing signals.

The dither coefficients of the selected pattern is added to an input video signal which may be a digital signal, and the resultant signal is supplied to a limiter 14. The limiter 14 limits the values of the output signal of the adder 13 that overflow or underflow the values of the total bits of the input video signal, to generate an output video signal. Lower bits of the output signal of the adder 13 may also be limited according to the gradation performance of the PDP 300.

Figure 5:
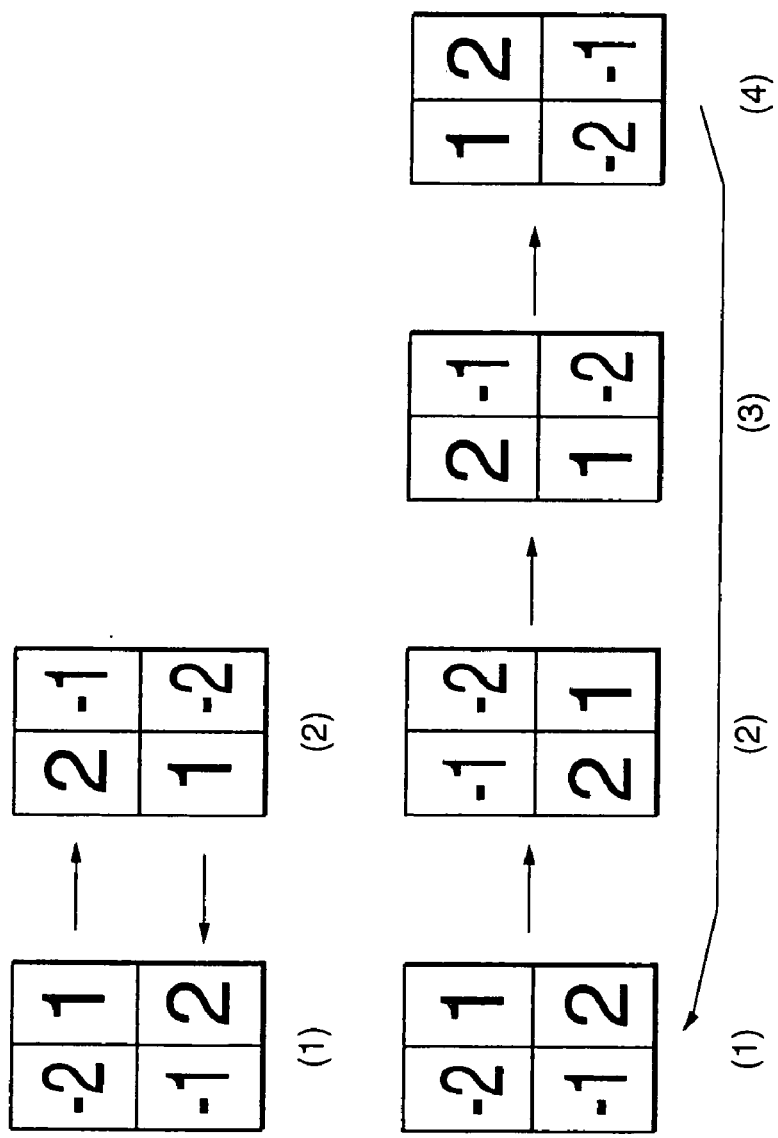
FIG. 5 illustrates dither coefficients patterns used in the first embodiment.

Illustrated in FIG. 5 are dither coefficients patterns, according to the present invention, each of which consists of a matrix of 2×2 dots (a, b, c and d).

The relationship between dot data on a display panel of the PDP 300 and the dither coefficients patterns is explained with reference to FIG. 6. There are a plurality of dots 302 of N lines and M columns on a display panel 301 of the PDP 300. Each dot shown in FIG. 6 corresponds to a pixel of one color such as red on the panel 301 for brevity. However, three dots of R, G and B are aligned in the direction of line on each section such as the section of the first line and the first column.

The dither coefficients of the matrix (a, b, c and d) are added to a video signal of dot data supplied to each dot 302. The dither coefficients (a, b, a, b, . . . ) and (c, d, c, d, . . . ) are added to luminance values of dot data on odd and even lines, respectively, starting from the head dot on each line.

Illustrated in (A) of FIG. 5 are two dither coefficients patterns (1) and (2) where the coefficients for the dots (a, b, c and d) are (−2, 1, −1 and 2) and (2, −1, 1 and −2), respectively. The two patterns can be switched for each field according to the selection data supplied to the selector 12.

Illustrated in (B) of FIG. 5 are four dither coefficient patterns (1) to (4) where the coefficients for the dots (a, b, c and d) are (−2, 1, −1 and 2), (−1, −2, 2 and 1), (2, −1, 1 and −2) and (1, 2, −2 and −1), respectively. The four patterns can be cyclically switched for each field according to the selection data supplied to the selector 12.

Figure 1:
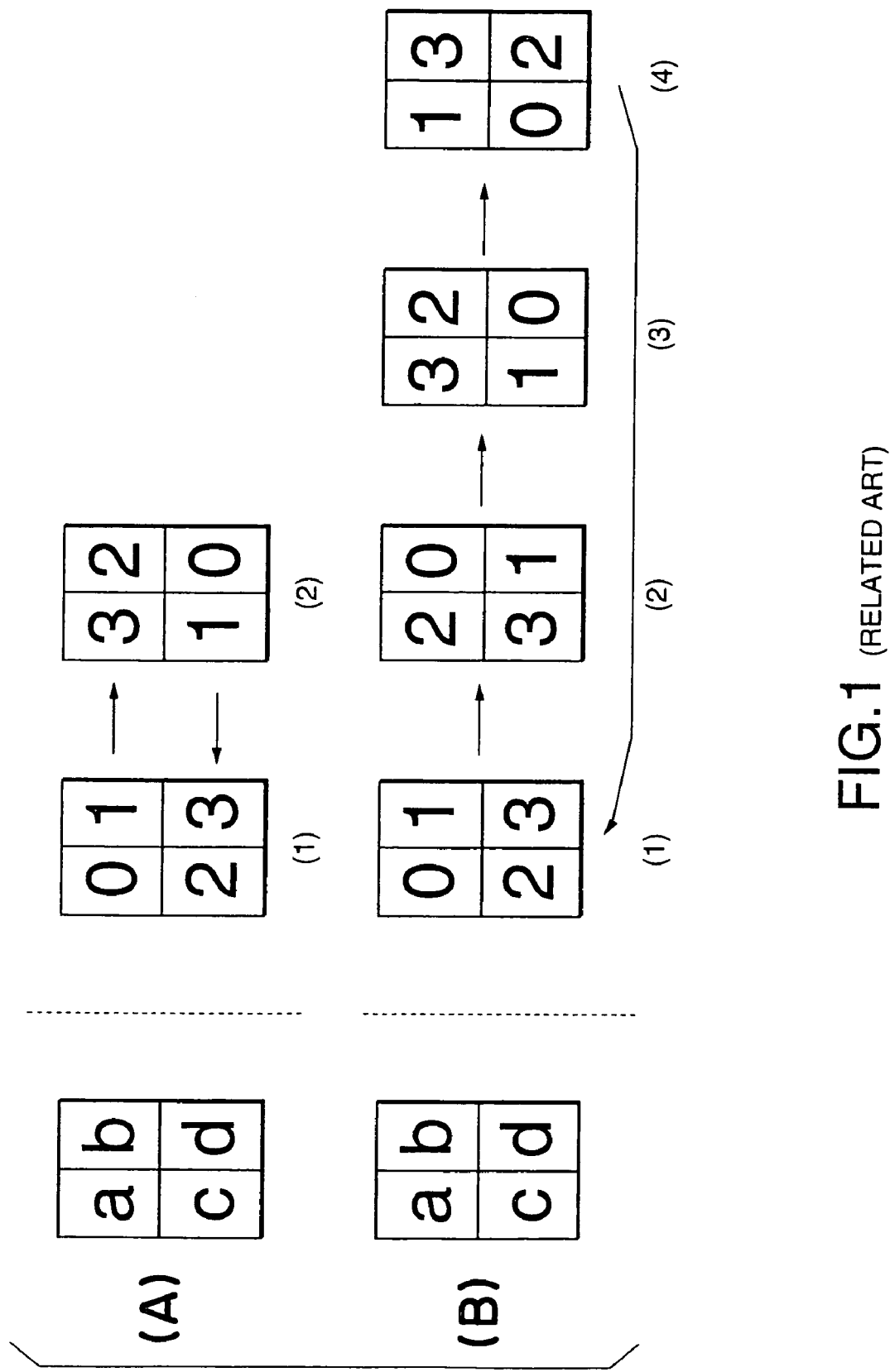
FIG. 1 illustrates well known dither coefficients patterns.

The dither coefficients patterns according to the present invention are different from those shown in FIG. 1 in that each pattern of the present invention consists of positive and negative coefficients, the sum total of which is zero. For example, the addition of the coefficient groups (−2, −1) and (1, 2) are zero in the pattern (1) shown in (A) of FIG. 5.

These dither coefficients patterns rarely generate noises when the coefficients are added to an input video signal because almost no pseudo edges are generated on pictures.

There are other preferable dither coefficients patterns besides those shown in FIG. 5, such as, (−1, 0, 1 and 0) which includes zero, (5, 3, −2 and −6) and (6, −2, −3 and −1) each of which does not include the same absolute value. Each matrix may not include the same number of positive and negative coefficients such as those shown in FIG. 5. Furthermore, each matrix may consist of (n×m) dots (n≠m) other than (n×n) dots, such as those in FIG. 5 where n=2, where "n" and "m" are positive integers larger than zero.

For (2×2) dot matrices, for example, the best dither coefficients patterns are those shown in FIG. 5 for achieving continuous gradation characteristics with extremely less generation of pseudo edges on pictures on the border between adjacent matrices, where the sum total of the coefficients is zero, the number of positive and negative coefficients is the same, and the absolute value for the opposing dots in the diagonal direction is the same, for example,

|−2|=|2|=2 and |−1|=|1|=1 in the dither coefficients pattern (1) shown in (A) of FIG. 5.

Figure 7:
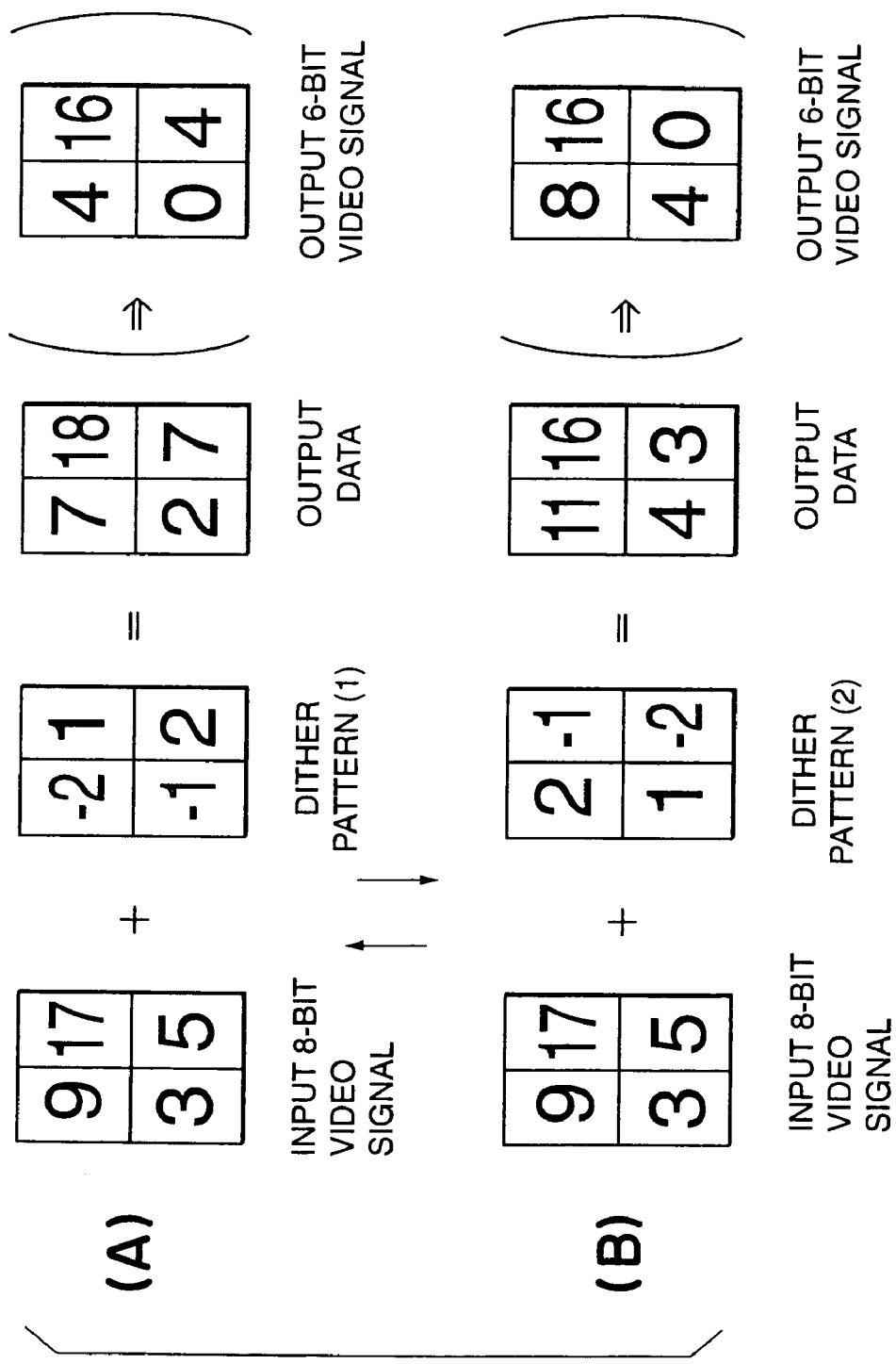
FIG. 7 illustrates video signal processing using the dither coefficients patterns shown in FIG. 5.

Illustrated in (A) and (B) of FIG. 7 is video signal processing executed by the video signal processor 100 (FIG. 3) using the dither coefficients patterns (1) and (2), respectively, shown in (A) of FIG. 5, where video signal components with the same data (9, 7, 3 and 5) are input for two successive fields.

In detail, the dither coefficients patterns (−2, 1, −1 and 2) and (2, −1, 1 and −2) shown in FIG. 7 are generated by the dither matrix coefficients generator 11.

The dither coefficients pattern (−2, 1, −1 and 2) shown in (A) of FIG. 7 is selected by the selector 12 according to the selection data. The selected pattern is added to dot data (9, 17, 3 and 5) of an input 8-bit video signal by the adder 13 to obtain data (7, 18, 2 and 7).

The data (7, 18, 2 and 7) might exceed the 8-bit data (9, 17, 3 and 5). The values of the (7, 18, 2 and 7) which overflow or underflow the values (9, 17, 3 and 5) are limited by the limiter 14. The values of lower two bits may also be dropped by the limiter 14 for a 6-bit PDP to obtain a 6-bit output video signal of data (4, 16, 0 and 4). Each data is expressed with a multiple number of four. The actual data for the 6-bit output video signal are (1, 4, 0 and 1).

The dither coefficients pattern (2, −1, 1 and −2) shown in (B) of FIG. 7 is then selected by the selector 12. The dither coefficients of the selected pattern is added to dot data (9, 17, 3 and 5) of the input 8-bit video signal by the adder 13 to obtain data (11, 16, 4 and 3).

The data (11, 16, 4 and 3) also might exceed the 8-bit data (9, 17, 3 and 5). The values of the (11, 16, 4 and 3) which overflow or underflow the values (9, 17, 3 and 5) are limited by the limiter 14. The values of lower two bits may also be dropped by the limiter 14 for a 6-bit PDP to obtain a 6-bit output video signal of data (8, 16, 4 and 0). Each data is also expressed with a multiple number of four. The actual data for the 6-bit output video signal are (2, 4, 1 and 0).

The dither coefficients patterns (1) and (2) shown in FIG. 7 are switched by the selector 12 for each field according to the field data (selection data) supplied thereto.

Video signal processing using the dither coefficients patterns (1) to (4) shown in (B) of FIG. 5 are basically the same as those discussed above with reference to FIG. 7. The dither coefficients patterns (1) to (4) can be switched cyclically for each field to achieve multi-gradation spatially continuous than those achieved by the dither coefficients patterns shown in (A) of FIG. 5.

Figure 2:
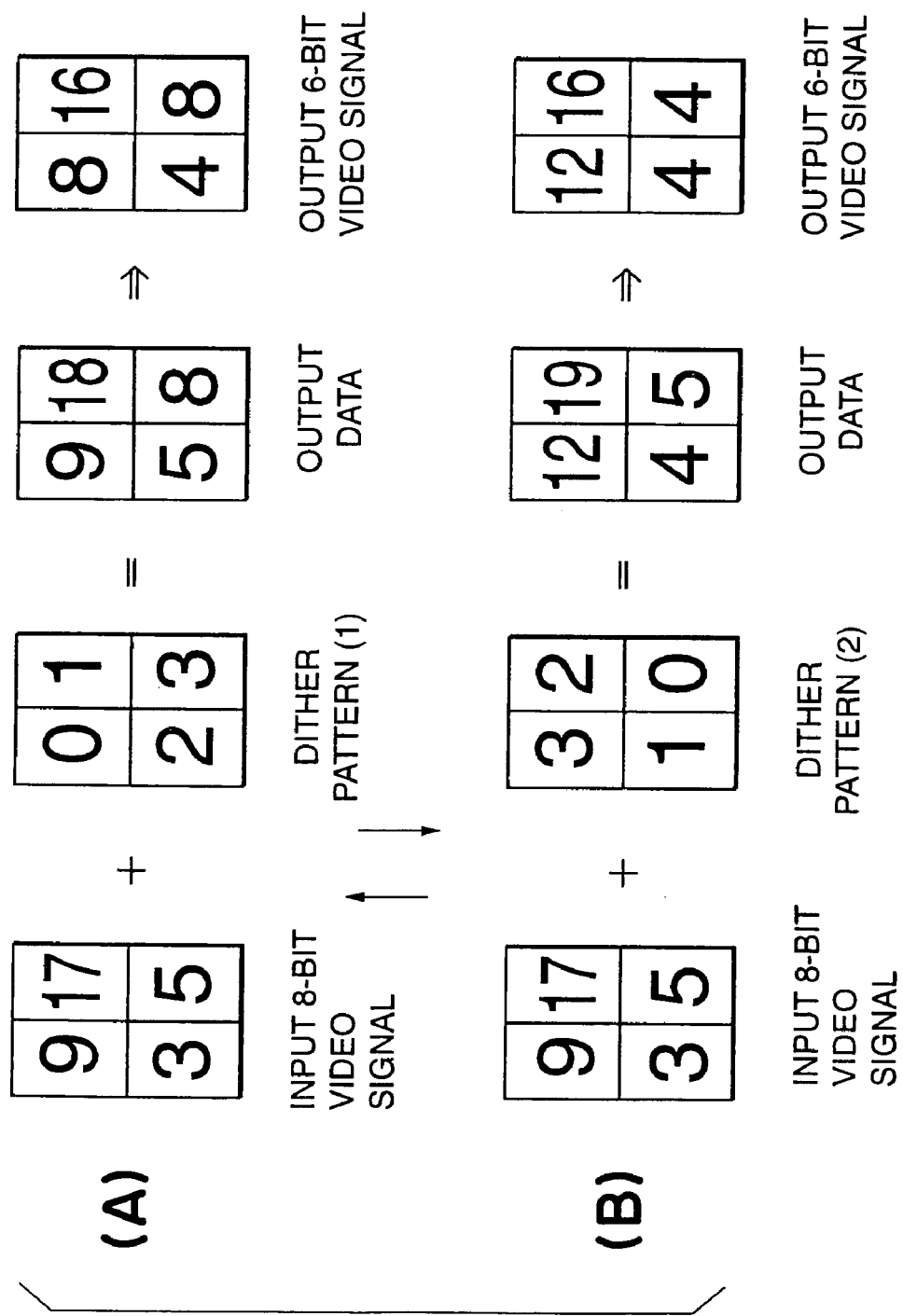
FIG. 2 illustrates video signal processing using the dither coefficients patterns shown in FIG. 1.

The first embodiment employs the dither coefficients patterns, such as those shown in FIG. 5 where the sum total of the coefficients is zero. Addition of such dither coefficients patterns to an input video signal will not increase gradations of color for an output video signal in the direction of time. This is evident from comparison between the output data, for example, those shown in FIGS. 2 and 7. The output data (7, 18, 2 and 7) of FIG. 7 according to the present invention does not increase its values compared to that (9, 18, 5 and 8) of FIG. 2 (related art) from input video signals of the same values as shown in FIGS. 2 and 7.

The present invention therefore achieves smooth and continuous color gradation characteristics with less visual luminance difference between adjacent gradation of color.

The present invention thus provides high quality pictures with extremely less pseudo edges which would otherwise be generated due to sub-field division.

The dither coefficients patterns (1) and (2) shown in FIG. 7 are switched for each field in response the field data supplied to the selector 12 (FIG. 4) as the selection data. The patterns may however be switched for each frame or for each pixel block. Furthermore, the dither coefficients patterns may be switched according to the location on the display panel 301 (FIG. 6) of the PDP 300 in response the positional data supplied to the selector 12.

Figure 8:
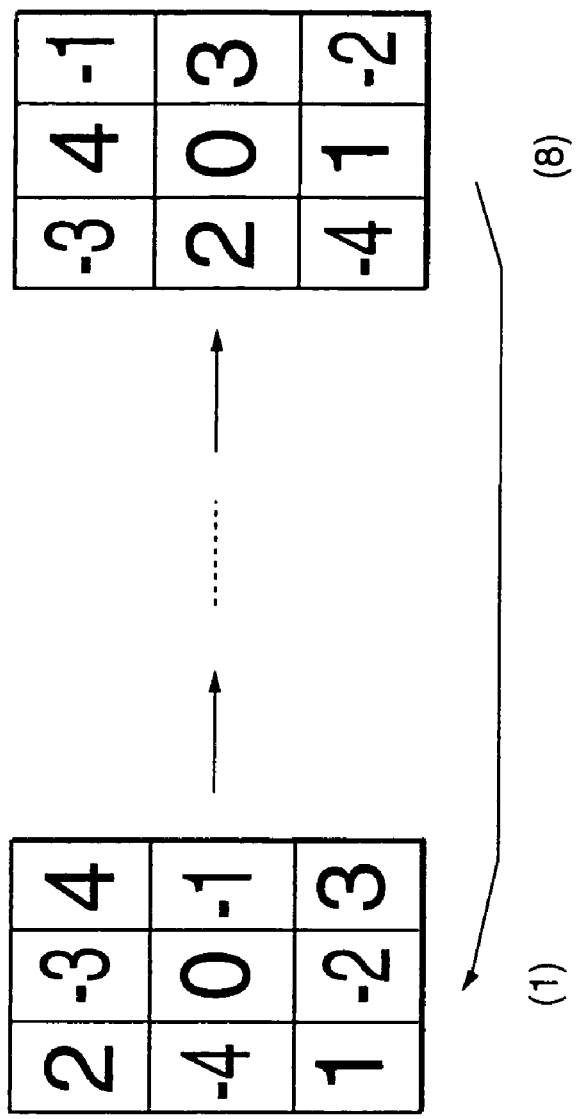
FIG. 8 illustrates switching of dither coefficients patterns used in the first embodiment.

Illustrated in FIG. 8 is switching of (n×n) dot matrix dither coefficients patterns where "n" is an odd number.

FIG. 8 shows dither coefficients patterns of (3×3) dot matrix (n=3). Like those shown in FIG. 5, the dither coefficients of a selected pattern are added to a video signal for dot data that are supplied to the dots 302 on the display panel 301.

For example, the dither coefficients (a, b, c, a, b, c, . . . ) is added to the video signal for the dot data on the first line (FIG. 6) from the leftmost dot; the dither coefficients (d, e, f, d, e, f, . . . ) is added to the video signal for the dot data on the second line from the leftmost dot; and the dither coefficients (g, h, i, g, h, i, . . . ) is added to the video signal for the dot data on the third line from the leftmost dot. These processing are repeated.

Illustrated in FIG. 8 are eight types of dither coefficients patterns although only two patterns are actually shown for brevity where the dither coefficient is zero for the dot "e" of the (3×3) dot matrix. The dither coefficients of the pattern (1) are (2, −3, 4 and −4) and (−1, 1, −2 and 3) for the dots (a, b, c and d) and (f, g, h and i), respectively.

The dither coefficients for the dots (a, b, c and d) and (f, g, h and i) are shifted in the clockwise direction from (1) to (8) to have eight types of dither coefficients patterns. The eight patterns can also be cyclically switched for each field, frame or pixel block.

Each dither coefficients pattern consists of an odd number of dither coefficients, and the same number of positive and negative dither coefficients except the center coefficient that is zero. The sum total of the positive and negative dither coefficients is zero.

For the same reason as discussed with respect to FIGS. 2 and 7, addition of these dither coefficients generates less noises to provide high quality pictures with less pseudo edges which would otherwise be generated due to a big luminance difference as already discussed.

Dither coefficients patterns of an odd number of coefficients may include zero for any of the dots (a, b, c and d) and (f, g, h and i) other than those shown in FIG. 8. The number of positive and negative dither coefficients may not be the same for each pattern. The matrix for each pattern may be of (n×m) dots where n≠m, other than (n×n) dots.

Any of the dither coefficients patterns disclosed above can be selected for displaying pictures on the PDP 300 (FIG. 3) with smooth and continuous gradation characteristics while less noises between adjacent matries.

Figure 9:
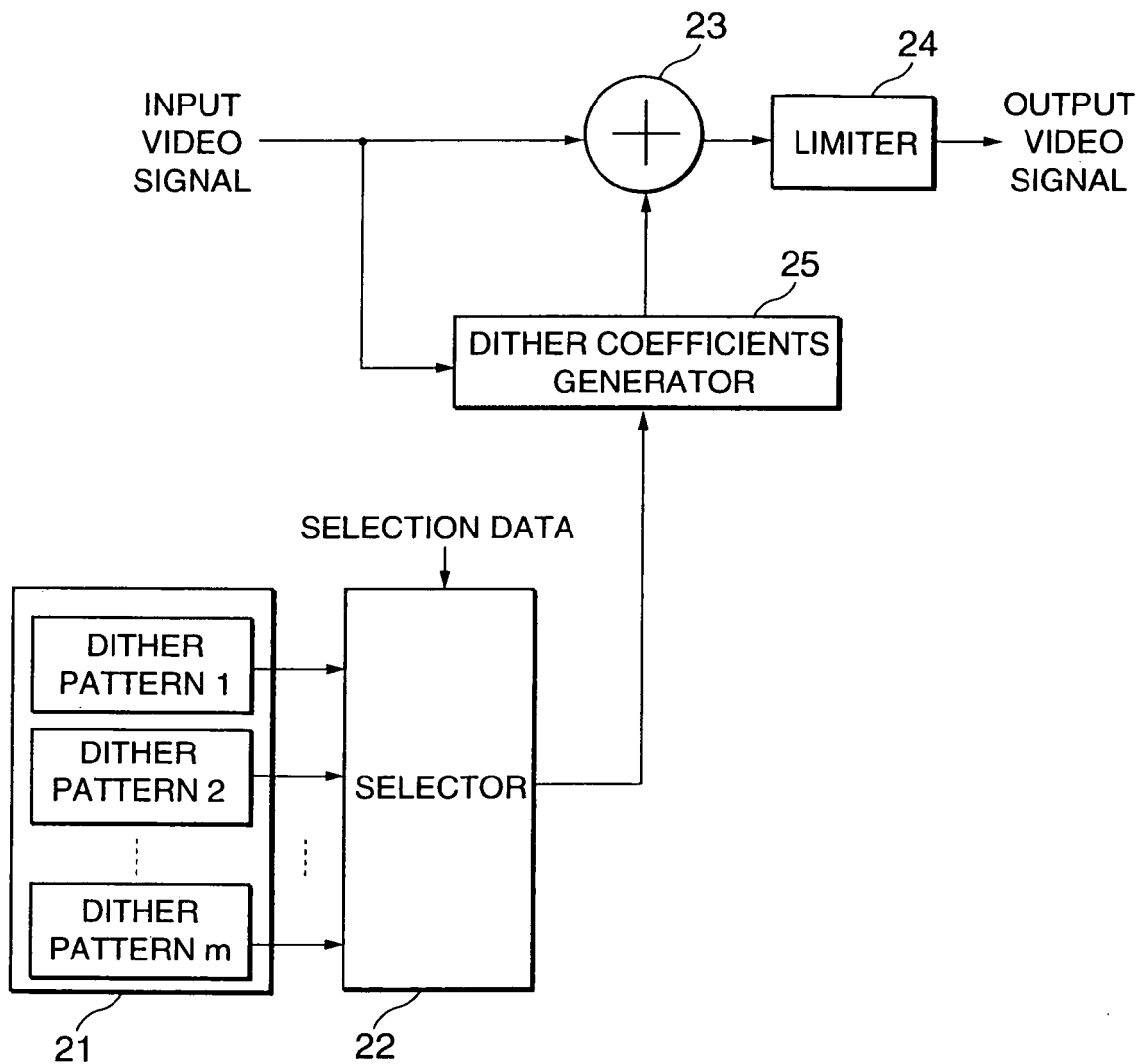
FIG. 9 shows a block diagram of the second preferred embodiment of a video signal processor according to the present invention.

Shown in FIG. 9 is a block diagram of the second embodiment of a video processor according to the present invention, which can be employed as the video processor 100 shown in FIG. 3.

A dither patterns generator 21 generates a plurality of (n×n) dot matrix dither patterns. Illustrated here are an "m" number of dither patterns, "m" being an integer of two or more. The generator 21 may include ROM for storing the dither patterns. Or, such dither patterns can be programmed as software.

The difference between the first and second embodiments is that the dither patterns generator 21 does not generate the dither coefficients themselves but generates information on their locations. In other words, the generator 21 generates patterns that indicate locations of dither coefficients on pixels for each matrix of the dots 302 on the display panel 301 (FIG. 6). The dither coefficients themselves are not decided yet when the generator 21 generates the patterns indicating locations of dither coefficients.

One of the dither patterns is selected by a selector 22 and supplied to a dither coefficients generator 25. The pattern selection is performed according to selection data supplied to the selector 22. The selection data is time data or positional data on the display panel 301. The time data is, for example, field data, that indicates the timing of selecting the patterns for each field, a predetermined unit of picture, carried by the video signal. The positional data is, for example, scanning line data or pixel data, both indicating the locations of the pixels on the display panel. These data are generated from horizontal and vertical synchronizing signals.

Also supplied to the dither coefficients generator 25 is an input digital video signal which may be a digital signal. The generator 25 detects gradations of color of the input video signal and divides the gradations into one or more gradation groups when the gradations of the video signal are equal to or lower than a reference level. The generator 25 then decides and generates dither coefficients for each gradation group of the input video signal in response to the selected dither pattern. The dither coefficients are set zero for the gradations of the video signal higher than the reference level.

The generated dither coefficients are supplied to an adder 23 and added to the input video signal, and the resultant signal is supplied to a limiter 24. The limiter 24 limits the values of the output signal of the adder 23 that underflow the values of bits of the input video signal, to generate an output video signal. Lower bits of the output signal of the adder 23 may also be limited according to the gradation performance of the PDP 300 (FIG. 3).

Figure 10:
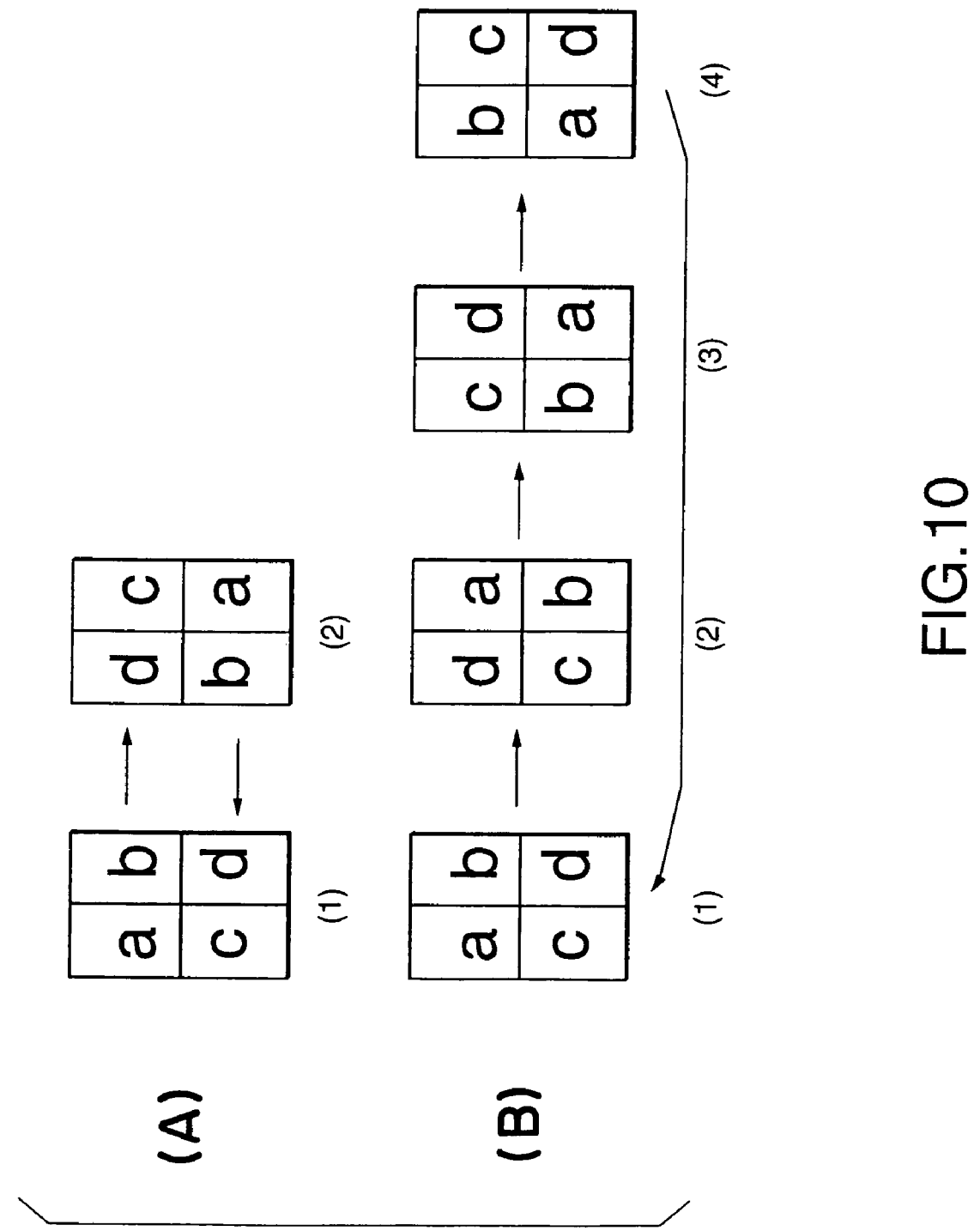
FIG. 10 illustrates dither patterns used in the second embodiment.

Illustrated in FIG. 10 are (2×2) dot matrix dither patterns generated by the dither patterns generator 21, that indicate locations on the display panel 301 (FIG. 6) where the dither coefficients generated by the dither coefficients generator 25 are added to the dot data.

The dither pattern (a, b, a, b, . . . ) of the pattern (1) shown in (A) of FIG. 10 indicates the locations on each dot data on each odd line on the display panel 301 where the dither coefficients are added to the dot data from the leftmost dot 302. The dither pattern (c, d, c, d, . . . ) of the pattern (1) shown in (A) of FIG. 10 is, on the other hand, indicates the location on each even line on the display panel 301 where the dither coefficients are added to the dot data from the leftmost dot 302. The dot data are supplied to the dots 302 of the display panel 301.

The dither pattern (d, c, d, c, . . . ) of the pattern (2) shown in (A) of FIG. 10 also indicates the locations on each odd line on the display panel 301 where the dither coefficients are added to the dot data from the leftmost dot 302. The dither pattern (b, a, b, a, . . . ) of the pattern (2) shown (A) of FIG. 10 also indicates the locations on each even line on the display panel 301 where the dither coefficients are added to the dot data from the leftmost dot 302. The dot data are supplied to the dots 302 of the display panel 301.

The dither patterns (1) and (2) shown in (A) of FIG. 10 are switched, for example, for each field according to selection data supplied to the selector 22 (FIG. 9).

Illustrated in (B) of FIG. 10 are four types of dither patterns of (a, b, c, and d), (d, a, c and b), (c, d, b and a) and (b, c, a and d), respectively, indicating locations on the display panel 301 (FIG. 6) where the dither coefficients generated by the dither coefficients generator 25 are added to the dot data. The four patterns can be switched cyclically for each field according to the selection data. FIG. 6 shows the dither pattern (1) shown in (A) of FIG. 10 used for the dots 302.

Illustrated in FIG. 11 are dither coefficients generated by the dither coefficients generator 25 for each gradation group of the input video signal, using the dither patterns (1) and (2) shown in (A) of FIG. 10.

Dither coefficients are decided for the gradations at the level 63 and under for a 256-gradation input video signal in FIG. 11. Shown here are dither coefficients at the gradation levels 0 to 15, 16 to 31, 32 to 47, and 48 to 63, respectively.

In (A) of FIG. 11, the dither coefficients (5, 3, −3 and −5) and (−5, −3, 3 and 5) are set for the dither patterns (a, b, c and d) and (d, c, b and a), respectively, at the gradation levels 0 to 15.

In (B) of FIG. 11, the dither coefficients (4, 2, −2 and −4) and (−4, −2, 2 and 4) are set for the dither patterns (a, b, c and d) and (d, c, b and a), respectively, for the gradation levels 16 to 31.

In (C) of FIG. 11, the dither coefficients (3, 1, −1 and −3) and (−3, −1, 1 and 3) are set for the dither patterns (a, b, c and d) and (d, c, b and a), respectively, for the gradation levels 32 to 47.

In (D) of FIG. 11, the dither coefficients (2, 1, −1 and −2) and (−2, −1, 1 and 2) are set for the dither patterns (a, b, c and d) and (d, c, b and a), respectively, for the gradation levels 48 to 63.

The dither coefficients shown in FIG. 11 also consist of both positive and negative coefficients, the sum total thereof being zero.

In the second embodiment, the dither coefficients are added only to the low gradation portions of an input video signal where there is a big visual luminance difference between adjacent color gradations, thus achieving continuous color gradation which would otherwise be degraded due to reverse-gamma correction processing.

The lower the gradation levels on the low gradation portions, the more the color gradation is degraded for the PDP 300 (FIG. 3) that provides color gradations with sub-field division. The second embodiment thus varies weighting for dither coefficients for each gradation level. In detail, the weighting, that is, the absolute values of dither coefficients are made larger as the gradation levels become low.

Figure 12:
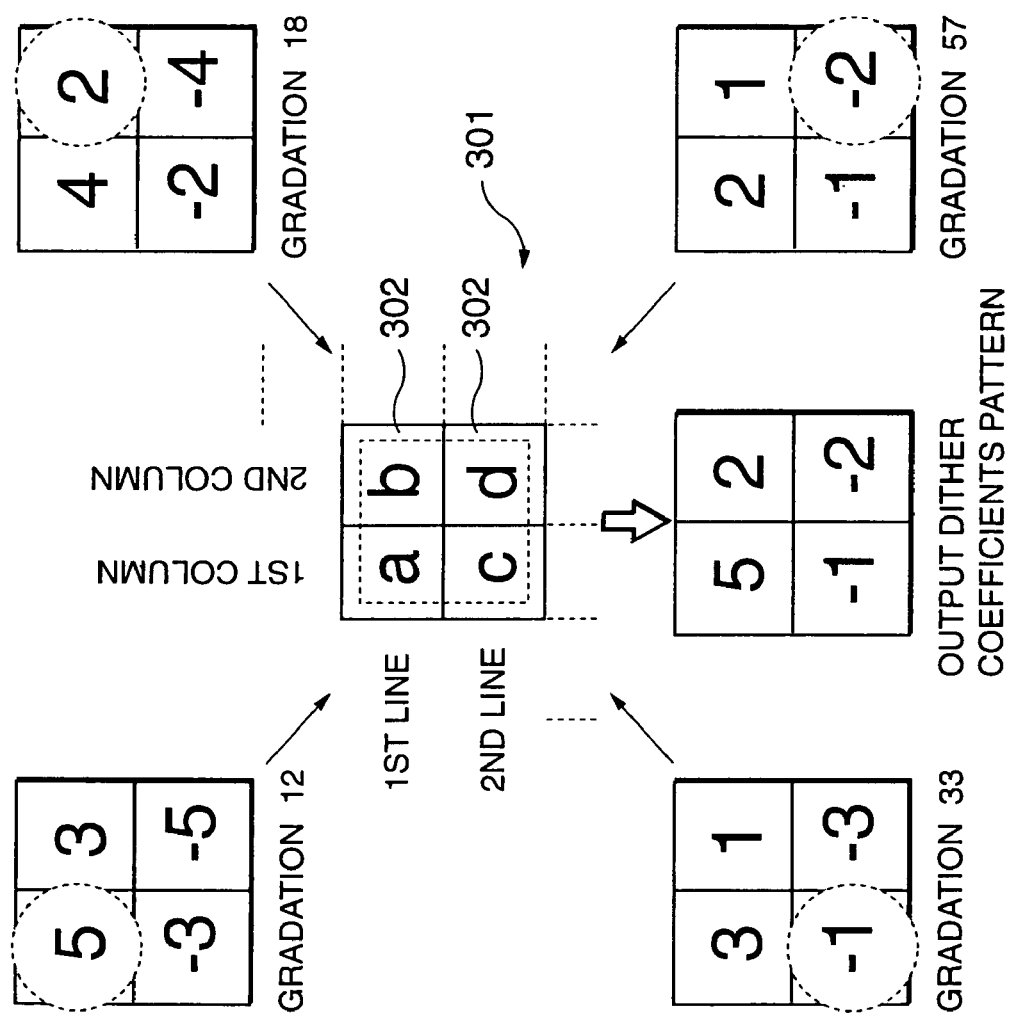
FIG. 12 illustrates decision of dither coefficients that will be added to an input video signal in the second embodiment.

Illustrated in FIG. 12 is decision of dither coefficients for (2×2) dither coefficients patterns that will be added to an input video signal using the dither pattern (1) shown in (A) of FIG. 10.

Suppose that, in FIG. 12, the color gradations of the input video signal are detected by the dither coefficients generator 25 (FIG. 9) as levels 12, 18, 33 and 57 for the dot 302 (FIG. 6) on the first line and the first column, the first line and the second column, the second line and the first column, and the second line and the second column, respectively, on the display panel 301.

The dither coefficients generator 25 selects dither coefficients at the detected gradation levels as follows:

The dither coefficients (5, 3, −3 and −5) shown in (A) of FIG. 11 are first selected for the dot 302 on the first line and the first column at the gradation level 12. Among them, the dither coefficient 5 is selected for the location "a".

The dither coefficients (4, 2, −2 and −4) shown in (B) of FIG. 11 are selected for the dot 302 on the first line and the second column at the gradation level 18. The dither coefficient 2 is then selected for the location "b".

The dither coefficients (3, 1, −1 and −3) shown in (C) of FIG. 11 are then selected for the dot 302 on the second line and the first column at the gradation level 33. The dither coefficient −1 is selected for the location "c".

The dither coefficients (2, 1, −1 and −2) shown in (D) of FIG. 11 are finally selected for the dot 302 on the second line and the second column at the gradation level 57. The dither coefficient −2 is selected for the location "d".

As explained, the dither coefficients (5, 2, −1 and −2) are output by the dither coefficients generator 25.

Figure 13:
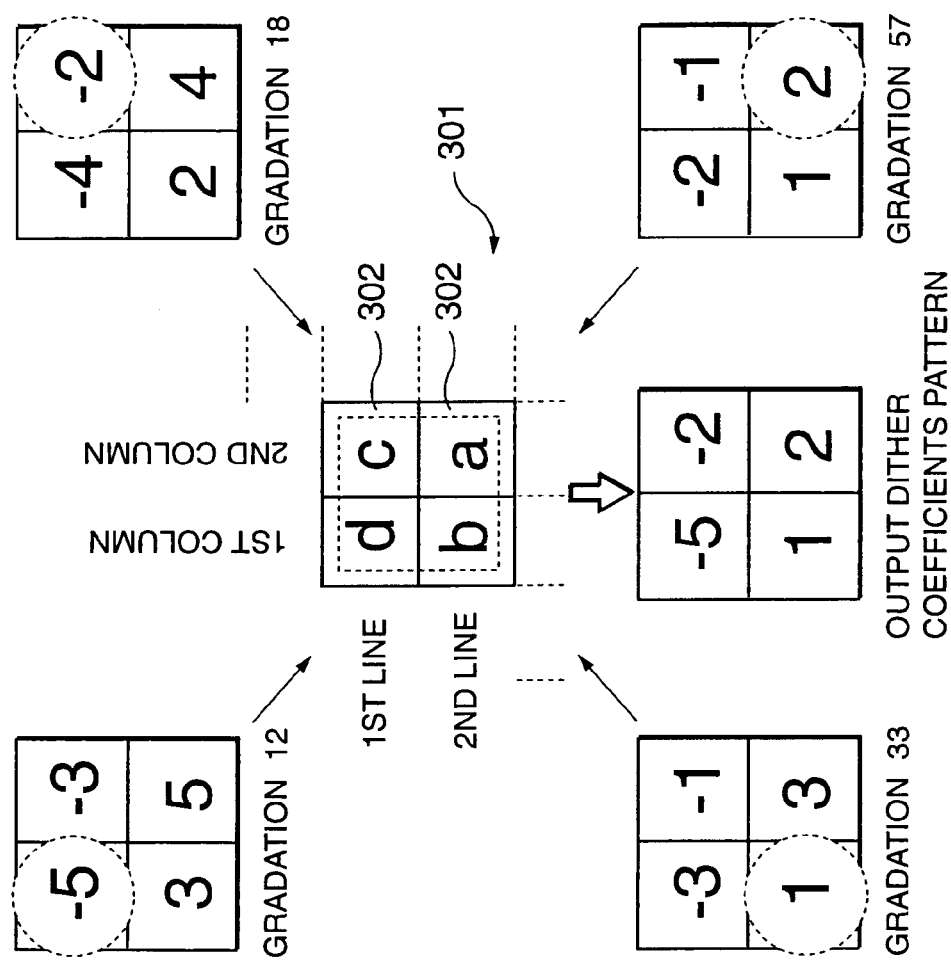
FIG. 13 illustrates decision of dither coefficients that will be added to an input video signal in the second embodiment.

Illustrated in FIG. 13 is also decision of dither coefficients performed by the dither coefficients generator 25 for (2×2) dither coefficients patterns that will be added to an input video signal using the dither pattern (2) shown in (A) of FIG. 10.

The color gradations of the input video signal are detected as levels 12, 18, 33 and 57 as disclosed above.

The dither coefficients (−5, −3, 3 and 5) shown in (A) of FIG. 11 are first selected for the dot 302 on the first line and the first column at the gradation level 12. Among them, the dither coefficient −5 is selected for the location "d".

The dither coefficients (−4, −2, 2 and 4) shown in (B) of FIG. 11 are also selected for the dot 302 on the first line and the second column at the gradation level 18. The dither coefficient −2 is then selected for the location "c".

The dither coefficients (−3, −1, 1 and 3) shown in (C) of FIG. 11 are then selected for the dot 302 on the second line and the first column at the gradation level 33. The dither coefficient 1 is selected for the location "b".

The dither coefficients (−2, −1, 1 and 2) shown in (D) of FIG. 11 are finally selected for the dot 302 on the second line and the second column at the gradation level 57. The dither coefficient 2 is selected for the location "a".

As explained, the dither coefficients (−5, −2, 1 and 2) are output by the dither coefficients generator 25.

Decision of dither coefficients for (2×2) dither coefficients patterns that will be added to an input video signal using the dither patterns (1) to (4) shown in (B) of FIG. 10 are also the same as those explained with reference to FIGS. 12 and 13. The dither coefficients decided by using the dither patterns (1) to (4) shown in (B) of FIG. 10 are (5, 2, −1 and −2), (−3, 4, −3 and 1), (−5, −2, 1 and 2) and (3, −4, 3 and −1), respectively.

As discussed, the dither coefficients generator 25 detects color gradations of input video signal on each of dot data that constitute a dot matrix on the display panel 301 (FIG. 6) before decision of dither coefficients. A detector for detecting such gradations may however be provided separately from the generator 25.

Figure 14:
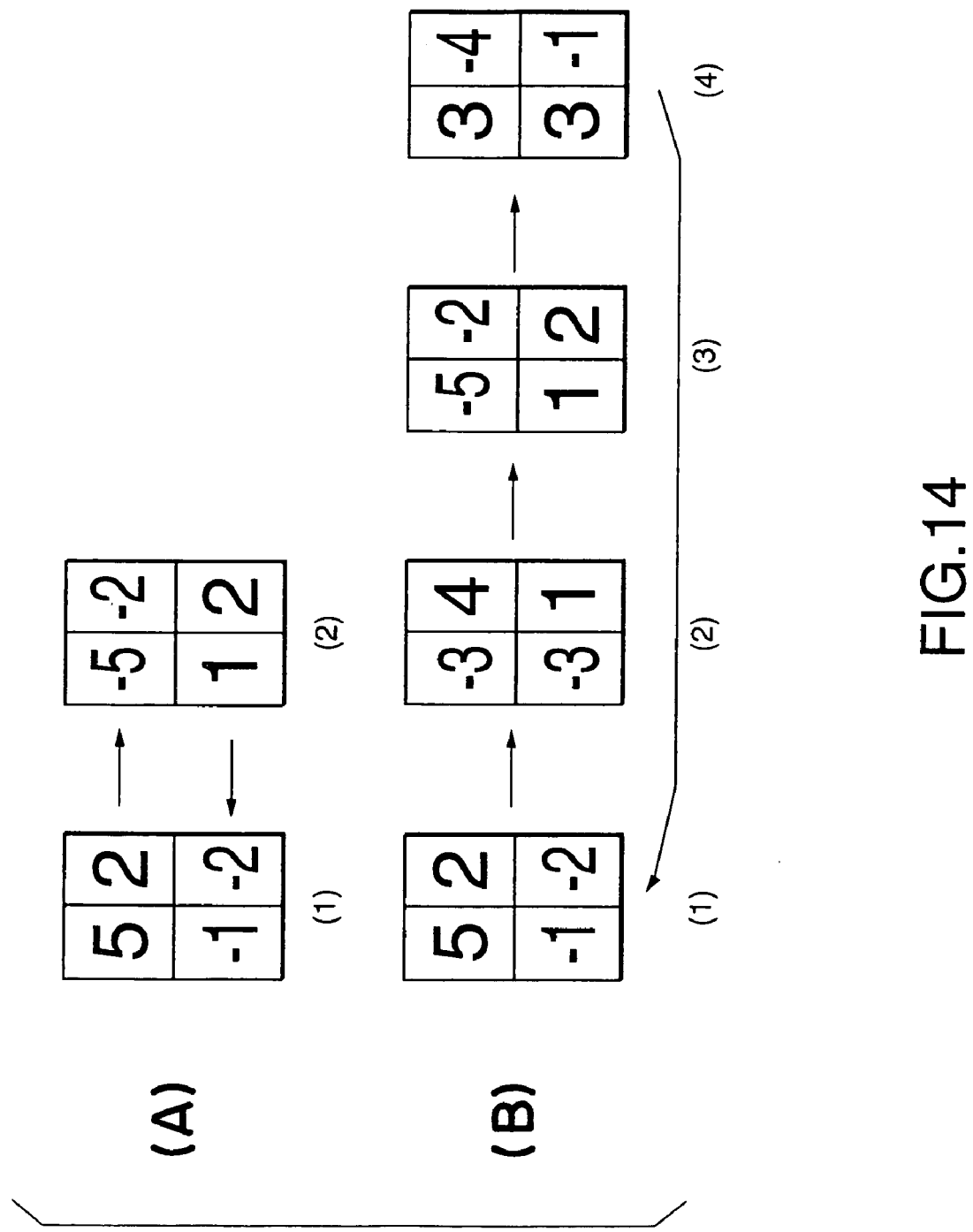
FIG. 14 illustrates dither coefficients patterns decided as shown in FIG. 12 or 13.

Illustrated in (A) of FIG. 14 are the dither coefficients patterns (1) and (2) decided as above using the dither patterns (1) and (2), respectively, shown in (A) of FIG. 10, which will be added to the input video signal by the adder 23 (FIG. 9). The dither coefficients patterns are switched for each filed before added to the video signal because the dither patterns (1) and (2) shown in (A) of FIG. 10 are switched for each field according to selection data supplied to the selector 22.

Illustrated in (B) of FIG. 14 are also the dither coefficients patterns (1) to (4) decided as above using the dither patterns (1) to (4), respectively, shown in (B) of FIG. 10, which will be added to the input video signal by the adder 23 (FIG. 9). The dither coefficients patterns can be switched cyclically for each filed before added to the video signal when the dither patterns (1) to (4) shown in (B) of FIG. 10 are switched for each field according to selection data supplied to the selector 22.

Figure 6:
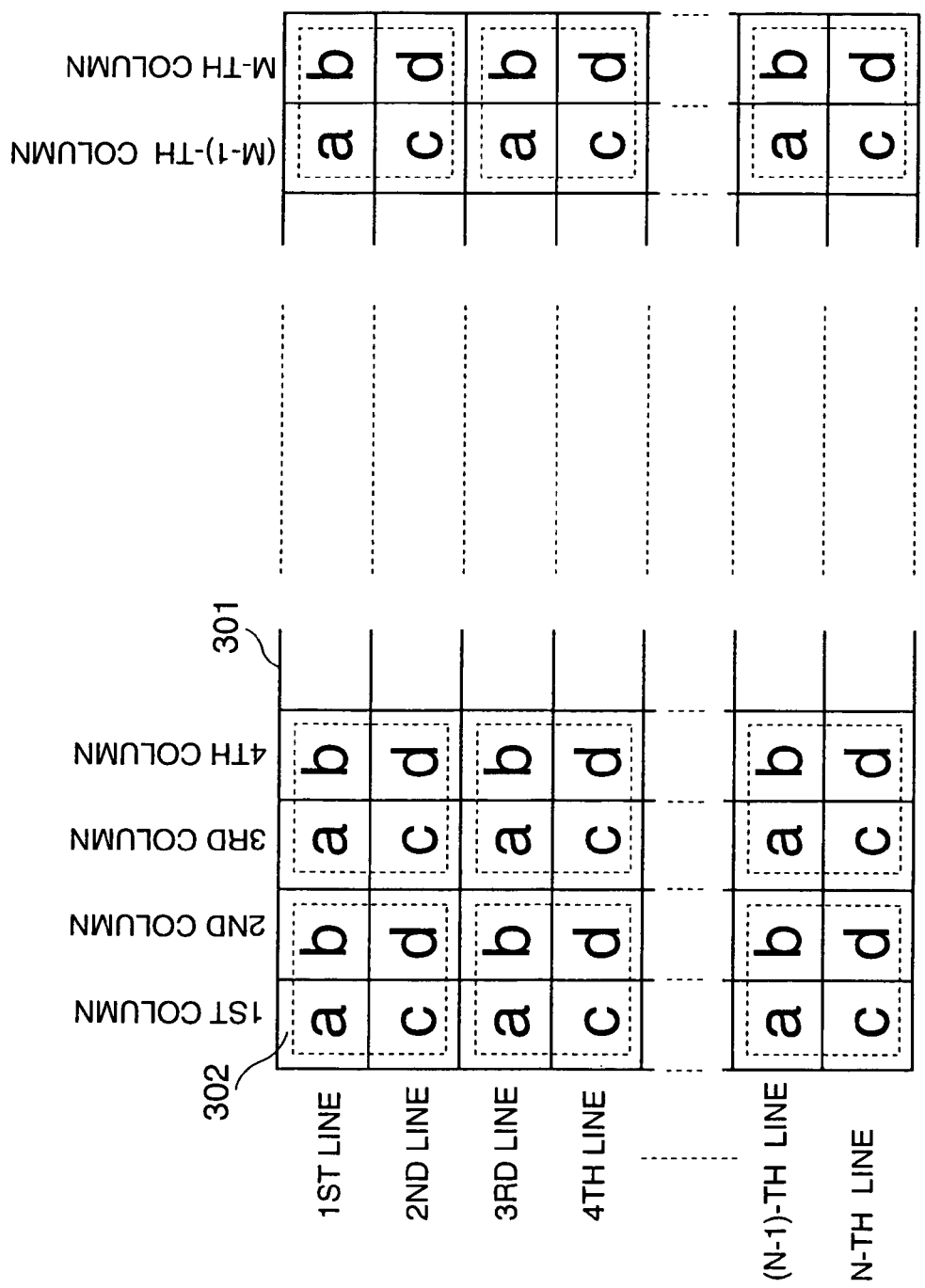
FIG. 6 illustrates the relationship between dot data and dither coefficients patterns on the display panel according to the present invention.

As understood from FIG. 14, integration of the dither coefficients in the direction of time will be zero for each dot 302 (FIG. 6). This is because integration in the direction of time is done by addition of the dither coefficients for each dot constituted by the positive and negative coefficients, the sum total thereof being zero.

These dither coefficients patterns therefore do not increase the overall gradation when added to an input video signal. High-quality pictures thus can be displayed with extremely less noises such as pseudo edges.

Dither coefficients patterns other than those shown in FIG. 14 can be generated by, for example, using the dither pattern (1) shown in (A) or (B) of FIG. 10 to decide dither coefficients for each dither matrix as disclosed with reference to FIG. 12, and shift the dither coefficients in each matrix.

Figure 15:
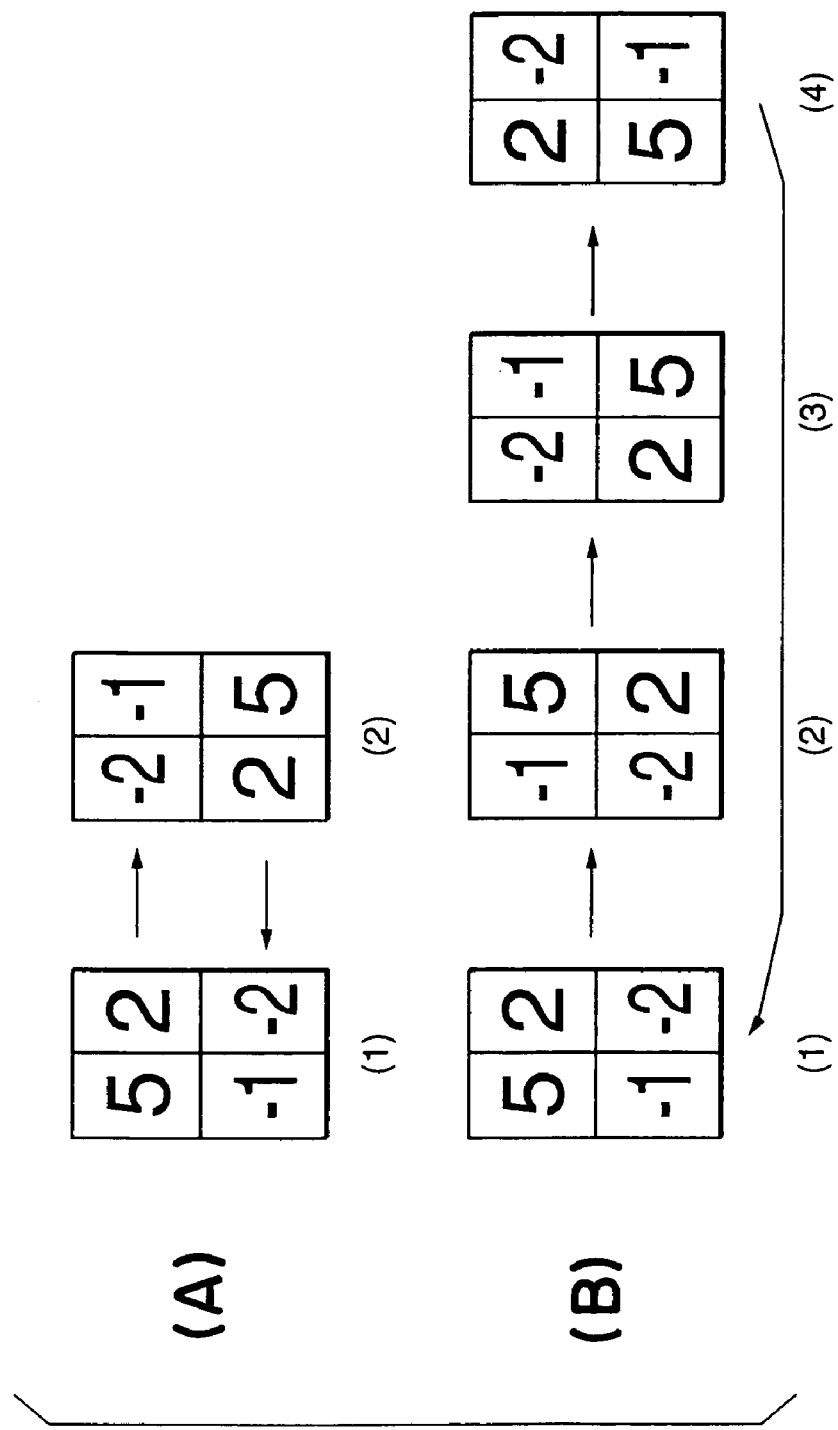
FIG. 15 illustrates dither coefficients patterns decided as shown in FIG. 12 or 13.

Generation of other dither coefficients patterns are illustrated in FIG. 15.

As discussed above, the dither coefficients pattern is decided as (5, 2, −1 and −2) as shown in (A) of FIG. 15 when the dither pattern (1) shown in (A) of FIG. 10 is used. A new dither coefficients pattern (−2, −1, 2 and 5) shown in (A) of FIG. 15 is then generated by replacing the opposing coefficients with each other in the pattern (5, 2, −1 and −2). For example, the coefficients "5" and "−2", and "−1" and "2" are replaced with each other.

The dither coefficients patterns (1) and (2) shown in (A) of FIG. 15 can be switched for each field.

Furthermore, as discussed above, the dither coefficients pattern is also decided as (5, 2, −1 and −2) as shown in (B) of FIG. 15 when the dither pattern (1) shown in (B) of FIG. 10 is used. New dither coefficients patterns (−1, 5, −2 and 2), (−2, −1, 2 and 5) and (2, −2, 5 and −1) shown in (B) of FIG. 15 are generated by shifting the dither coefficients (5, 2, −1 and −2) in the clockwise direction.

The dither coefficients patterns (1) to (4) shown in (B) of FIG. 15 can be switched cyclically for each field.

Other dither coefficients patterns can be generated by, for example, using the dither pattern (2) shown in (A) or (B) of FIG. 10, or either of patterns (3) and (4) shown in (B) of FIG. 10 to decide dither coefficients for each dither matrix as disclosed with reference to FIG. 13, and shift the dither coefficients in each matrix.

Figure 16:
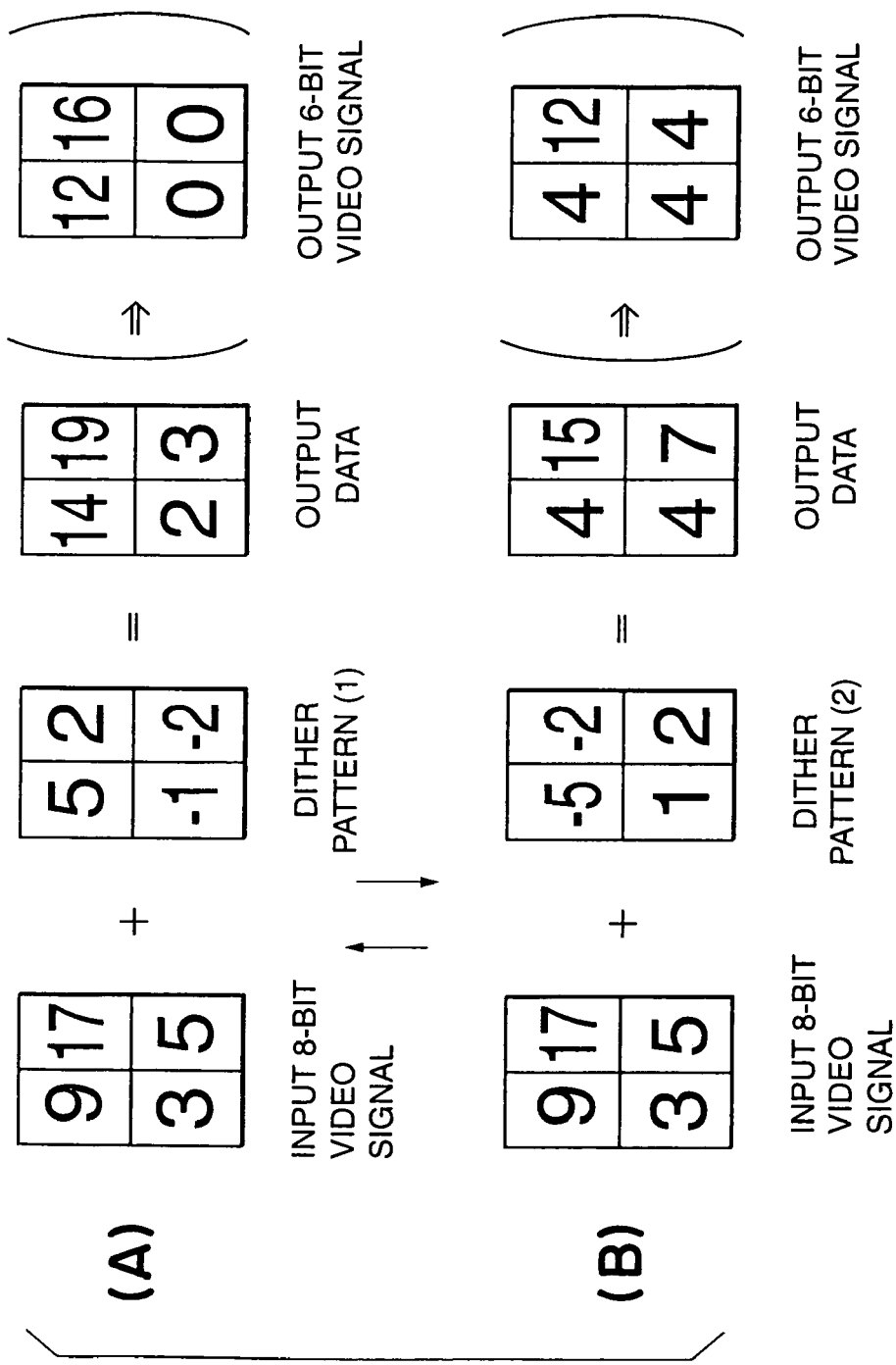
FIG. 16 illustrates video signal processing using the dither coefficients patterns shown in (A) of FIG. 14.

Illustrated in (A) of FIG. 16 is the processing executed by the video signal processor shown in FIG. 9 using the dither coefficients pattern (1) shown in (A) of FIG. 14, where two video signal components with the same data (9, 17, 3 and 5) are input for two successive fields.

The dither coefficients pattern (1) shown in (A) of FIG. 16 is added by the adder 23 (FIG. 9) to an 8-bit input video signal of dot data (9, 17, 3 and 5) to generate data (14, 19, 2 and 3).

The values of the data (14, 19, 2 and 3) which underflow the input 8-bit data are limited by the limiter 24 because some values smaller than zero of the generated data might exceed the input 8-bit data.

Lower 2-bit data of (14, 19, 2 and 3) may be dropped by the limiter 24 for a 6-bit PDP to generate 6-bit signal (12, 16, 0 and 0). Each of the 6-bit signal data is expressed with a multiple of four. The actual data for the 6-bit signal are (3, 4, 0 and 0).

Illustrated in (B) of FIG. 16 is the processing also executed by the video signal processor shown in FIG. 9 using the dither coefficients pattern (2) shown in (B) of FIG. 14.

The dither coefficients pattern (2) shown in (B) of FIG. 16 is added by the adder 23 to the 8-bit input video signal of dot data (9, 17, 3 and 5) to generate data (14, 15, 4 and 7).

The values of the data (14, 15, 4 and 7) which underflow the input 8-bit data are limited by the limiter 24 because some values smaller than zero of the generated data might exceed the input 8-bit data.

Lower 2-bit data of (14, 15, 4 and 7) may be dropped by the limiter 24 for a 6-bit PDP to generate 6-bit signal (4, 12, 4 and 4). Each of the 6-bit signal data is expressed with a multiple of four. The actual data for the 6-bit signal are (1, 4, 1 and 1).

The output video signals shown in (A) and (B) of FIG. 16 are switched, for example, for each field according to the selection data supplied to the selector 22.

The same proceeding is executed for the dither coefficients patterns (1) to (4) shown in (B) of FIG. 14 except that the four types of dither patterns are switched cyclically for each field to provide a multi-gradation video signal spatially continuous than those obtained when the dither coefficients pattern (1) or (2) shown in (A) of FIG. 14 is used. The same processing is also executed for the dither coefficients patterns shown in FIG. 15.

As discussed above, according to the second embodiment, color gradations of an input video signal are divided into a plurality of gradation groups and dither coefficients patterns appropriate to the gradation groups are added to the video signal, thus achieving an effective adjustment to all the gradations.

Furthermore, as shown in FIG. 11, the dither coefficients patterns are added to the input video signal for the low-luminance level regions (gradation levels 63 or under) where gradations would otherwise be degraded due to reverse-gamma correction, thus achieving extremely less increase in the overall gradation of the output video signal, and providing pictures with almost the same gradation as those of the input video signal. The gradation adjustment is more effective by making larger the weightings (absolute values) for the dither coefficients as the gradations become smaller, as shown in FIG. 11.

Among the dither coefficients patterns, those shown in FIG. 14 are the best patterns in the second embodiment. This is because each of these patterns consists of the positive and negative dither coefficients for each dot 302 (FIG. 6) in the direction of time, the sum total of which is zero, thus addition of these patterns to an input video signal will not promote increase in the overall color gradation.

The processing illustrated in FIGS. 12 and 13 are for the dots 302 where there are big differences in level of adjacent gradations, such as, the levels 12, 18, 33 and 57. However, for dots where there are not so big differences in level of adjacent gradations and which are in the gradation groups shown in FIG. 11, the dither coefficients patterns decided as shown in FIGS. 12 and 13 become the same as those shown in FIG. 11.

The dither coefficients patterns shown in FIG. 11 are set so that the sum total of the coefficients in each pattern is zero, thus the sum total of the dither coefficients which are actually added to a video signal is also zero. Extremely less noises thus will be generated for pictures when the dither coefficients shown in FIG. 11 are added to a video signal where color gradations for the dots 302 are in the gradation groups shown in FIG. 11.

Not only for each field, the dither coefficients patterns of the second embodiment can be switched for each frame or each pixel block. Furthermore, the dither patterns may be switched as time elapses or according to the locations on the display panel 301 (FIG. 6).

The dither patterns disclosed in the second embodiment consist of the positive and negative coefficients for adjusting color gradations so that the number of gradation levels of an output video signal is the same as that of gradations of an input video signal. On the other hand, addition of the dither coefficients is executed only for achieving continuous gradation linearity.

The final dither coefficients patterns can be decided for display apparatus with low display performance, thus achieving continuous gradation linearity with apparent increase in the number of gradation levels.

Furthermore, not only to video signal components of gradation levels lower than a reference level, such as level 63 or under as shown in FIG. 11, the dither coefficients can be added to other video signal components of intermediate or high gradation levels or all the gradation levels, depending on qualities of pictures to be displayed. For covering any gradation levels, setting the weighting (absolute values) larger for the dither coefficients as gradation levels become lower is the best. However, not only this, weighting can be varied and dither coefficients patterns can be optimized depending on the gradation characteristics of a matrix display apparatus.

Figure 17:
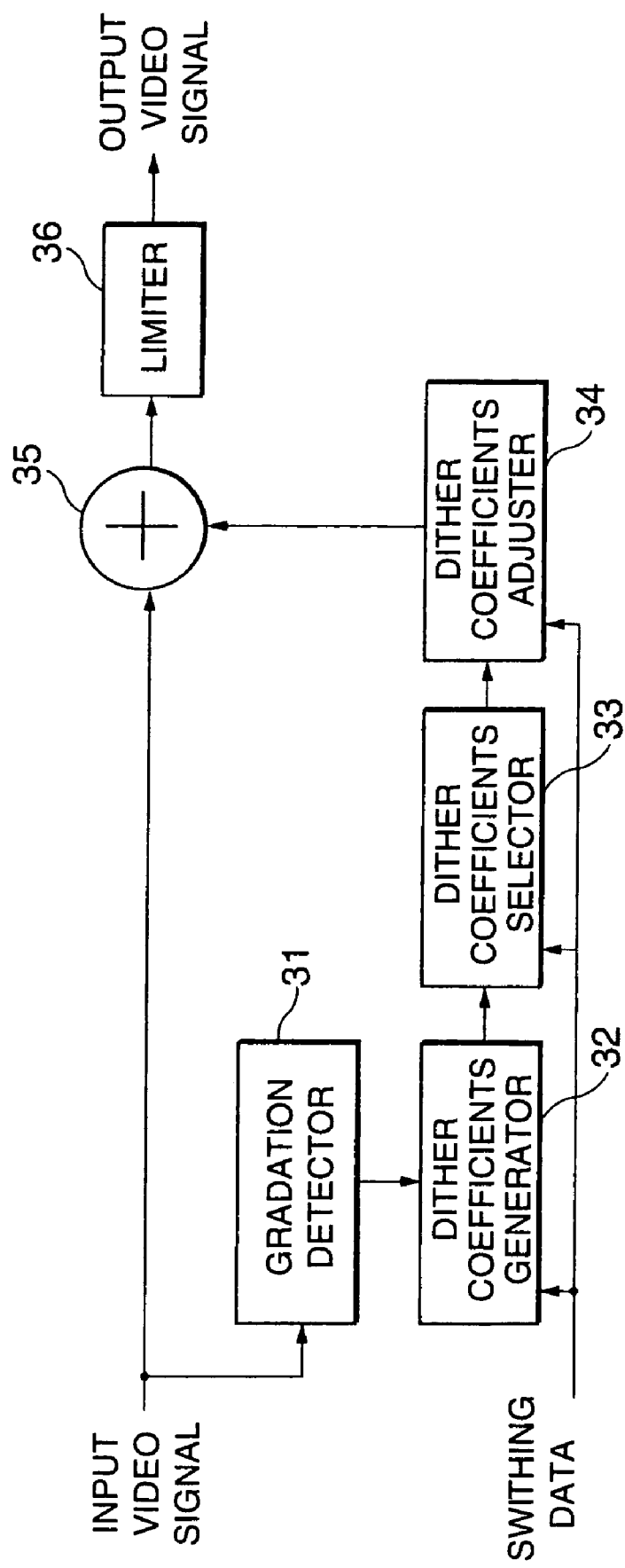
FIG. 17 shows a block diagram of the third preferred embodiment of a video signal processor according to the present invention.

Next, shown in FIG. 17 is a block diagram of the third embodiment of a video processor according to the present invention, which can be employed as the video processor 100 shown in FIG. 3.

Features of the third embodiment are not addition of predetermined (n×n) matrix dither coefficients patterns to a video signal but generation of dither coefficients patterns each being the best for the locations of a video signal on the display panel 301 (FIG. 6) with respect to each section (matrix) of dots 302 and the color gradations of each dot 302, the matrix of the dither pattern and that of the dots 302 are the same size.

In FIG. 17, a digital video signal is supplied to a gradation detector 31. The detector 31 detects color gradation of dot data which will be supplied to each dot 302 on the display panel 301.

The detected dot-data gradation is supplied to a dither coefficients generator 32. The generator 32 divides the digital video signal components that are equal to or lower than a reference gradation level into one or more gradation groups, and generates a dither coefficients pattern for each gradation group. The dither coefficients are set zero for the gradations of the video signal higher than the reference gradation level.

The dither coefficients pattern for each gradation group is supplied to a dither coefficients selector 33. The selector 33 selects one dither coefficient among the dither coefficients in the gradation group for each dot 302 (FIG. 6) and that corresponds to the location of the dot 302. The dither coefficients selected for a plurality of dots 302 are combined by the selector 33 into a dither coefficients pattern.

The dither coefficients pattern is then supplied to a dither coefficients adjuster 34. The adjuster 34 adjusts the coefficients that constitute the dither coefficients pattern so that the sum total of the coefficients is zero.

The adjusted dither coefficients pattern is supplied to an adder 35 and added to the input video signal which is also supplied to the adder 35. The resultant signal is supplied to a limiter 36.

The limiter 36 limits the values of the output signal of the adder 35 that underflow or overflow the values of bits of the input video signal, to generate an output video signal. Lower bits of the output signal of the adder 35 may also be limited according to the gradation performance of the PDP 300 (FIG. 3).

Illustrated in FIG. 18 are dither coefficients patterns generated by the dither coefficients generator 32 (FIG. 17).

Dither coefficients are generated at the gradations level 63 and under for a 256-gradation input video signal in FIG. 18. Shown in FIG. 18 are dither coefficients for the gradation levels 0 to 15, 16 to 31, 32 to 47, and 48 to 63, respectively.

In (A) of FIG. 18, the dither coefficients (5, 3, −3 and −5) are generated for the pattern (a, b, c and d) at the gradation levels 0 to 15.

In (B) of FIG. 18, the dither coefficients (4, 2, −2 and −4) are generated for the pattern (a, b, c and d) at the gradation levels 16 to 31.

In (C) of FIG. 18, the dither coefficients (3, 1, −1 and −3) are generated for the pattern (a, b, c and d) at the gradation levels 32 to 47.

In (D) of FIG. 18, the dither coefficients (2, 1, −1 and −2) are generated for the pattern (a, b, c and d) at the gradation levels 48 to 63.

Each (2×2) matrix dither coefficients pattern corresponds to dot data supplied to each dot 302 (FIG. 6) on the display panel 301. In detail, the dither coefficients (a, b, a, b, ... ) and (c, d, c, d, ... ) correspond to the dot data on an odd and even line, respectively, on the display panel 301 beginning from the leftmost dot.

Illustrated in FIG. 19 are switching of two dither coefficients patterns at respective gradation levels (groups) in the third embodiment.

The pattern switching is performed according to switching data supplied to the dither coefficients generator 32 (FIG. 17). The switching data is time data or positional data on the display panel 301 (FIG. 6). The time data is, for example, field data, that indicates the timing of switching patterns for each filed, a predetermined unit of picture, carried by the video signal. The positional data is, for example, scanning line data or pixel data, both indicating the locations of the pixels on the display panel. These data are generated from horizontal and vertical synchronizing signals. The switching data is also supplied to the dither coefficients selector 33 and the dither coefficients adjuster 34, which will be described later.

In (A) of FIG. 19, the dither coefficients (a, b, c and d) are set (5, 3, −3 and −5) and also (−5, −3, 3 and 5) at the gradation levels 0 to 15, and the two dither coefficients patterns are switched for each field.

In (B) of FIG. 19, the dither coefficients (a, b, c and d) are set (4, 2, −2 and −4) and also (−4, −2, 2 and 4) at the gradation levels 16 to 31, and the two dither coefficients patterns are switched for each field.

In (C) of FIG. 19, the dither coefficients (a, b, c and d) are set (3, 1, −1 and −3) and also (−3, −1, 1 and 3) at the gradation levels 32 to 47, and the two dither coefficients patterns are switched for each field.

In (D) of FIG. 19, the dither coefficients (a, b, c and d) are set (2, 1, −1 and −2) and also (−2, −1, 1 and 2) at the gradation levels 48 to 63, and the two dither coefficients patterns are switched for each field.

Illustrated in FIG. 20 are switching of four dither coefficients patterns at respective gradation levels (groups) by the dither coefficients generator 32 according to the switching data.

In (A) of FIG. 20, the dither coefficients (a, b, c and d) are set (5, 3, −3 and −5), (−3, 5, −5 and 3), (−5, −3, 3 and 5) and (3, −5, 5 and −3) at the gradation levels 0 to 15, and the four dither coefficients patterns are switched cyclically for each field.

In (B) of FIG. 20, the dither coefficients (a, b, c and d) are set (4, 2, −2 and −4), (−2, 4, −4 and 2), (−4, −2, 2 and 4) and (2, −4, 4 and −2) at the gradation levels 16 to 31, and the four dither coefficients patterns are switched cyclically for each field.

In (C) of FIG. 20, the dither coefficients (a, b, c and d) are set (3, 1, −1 and −3), (−1, 3, −3 and 1), (−3, −1, 1 and 3) and (1, −3, 3 and −1) at the gradation levels 32 to 47, and the four dither coefficients patterns are switched cyclically for each field.

In (D) of FIG. 20, the dither coefficients (a, b, c and d) are set (2, 1, −1 and −2), (−1, 2, −2 and 1), (−2, −1, 1 and 2) and (1, −2, 2 and −1) at the gradation levels 48 to 63, and the four dither coefficients patterns are switched cyclically for each field.

Each dither coefficients pattern shown in FIG. 20 consists of the same number of positive and negative coefficients, the sum total of which is zero.

These dither patterns rarely generate noises when the coefficients are added to a video signal because almost no pseudo edges are generated on pictures.

There are other preferable dither patterns besides those shown in FIG. 20, such as, (−1, 0, 1 and 0) which includes zero, (5, 3, −2 and −6) and (6, −2, −3 and −1) each of which does not include the same absolute value. Each matrix may not include the same number of positive and negative coefficients such as those shown in FIG. 20. Furthermore, each matrix may consist of n×m dots (n≠m) other than n×n dots, such as those shown in FIG. 20 where n=2.

For 2×2 dot matrices, for example, the best dither coefficients patterns are those shown in FIG. 20, for achieving continuous color gradation characteristics and extremely less generation of pseudo edges on pictures on the border between adjacent matrices, where the sum total of the coefficients is zero, the number of positive and negative coefficients is the same, and the absolute value for the opposing dots in the diagonal direction is the same, for example,

|5|=|−5|=5 and |−3|=|3|=3, as shown in (A) of FIG. 20.

In the third embodiment, the dither coefficients are added only to the low gradation portions of an input video signal where there is a big visual luminance difference between adjacent color gradations, thus providing continuous color gradation which would otherwise be degraded due to reverse-gamma correction processing.

The lower the gradation levels on the low gradation portions, the more the color gradation is degraded for the PDP 300 (FIG. 3) that provides color gradations with sub-field division. The third embodiment thus varies weighting for dither coefficients for each gradation level. In detail, the weighting, that is, the absolute values of dither coefficients are made larger as the gradation level lowers.

A dither coefficients pattern is generated by the dither coefficients generator 32 (FIG. 32) for each dot 302 (FIG. 6) in consideration of the locations of a video signal on the display panel 301 with respect to each section (matrix) of dots 302 and the color gradations of each dot 302, without deciding dither coefficients yet.

The dither coefficients are selected by the dither coefficient selector 33 and the dither coefficients patterns to be added to the input video signal are adjusted by the dither coefficients adjuster 34, as shown in FIG. 17.

Figure 21:
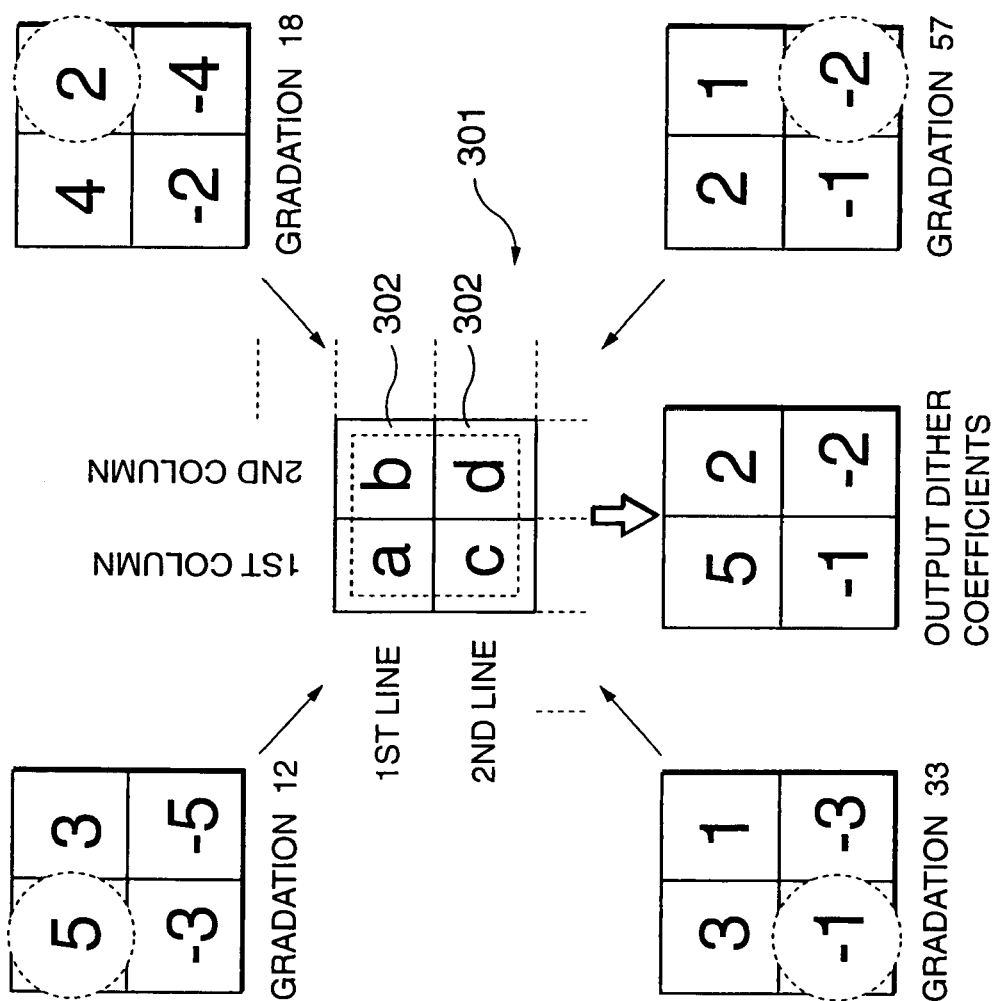
FIG. 21 illustrates selection of dither coefficients in the third embodiment.

Illustrated in FIG. 21 is selection of dither coefficients executed by the dither coefficients selector 33 using the dither coefficients patterns (5, 3, −3 and −5), (4, 2, −2 and −4), (3, 1, −1 and −3) and (2, 1, −1 and −2) shown in (A), (B), (C) and (D), respectively, of FIG. 20.

Furthermore, the dither coefficients selection shown in FIG. 21 is executed for the (2×2) dot matrices on the display panel 301 (FIG. 6) on the first line and the first column, the first line and the second column, the second line and the first column, and the second line and the second column, respectively.

Suppose that, in FIG. 21, the color gradations of the input video signal are detected by the gradation detector 31 as levels 12, 18, 33 and 57 for the dot 302 on the first line and the first column, the first line and the second column, the second line and the first column, and the second line and the second column, respectively, on the display panel 301.

The dither coefficients selection shown in FIG. 21 is executed by the dither coefficients selector 33 as follows:

The dither coefficients (5, 3, −3 and −5) shown in (A) of FIG. 20 are first selected for the dot 302 on the first line and the first column at the gradation level 12. Among them, the dither coefficient 5 is selected for the location "a".

The dither coefficients (4, 2, −2 and −4) shown in (B) of FIG. 20 are also selected for the dot 302 on the first line and the second column at the gradation level 18. The dither coefficient 2 is then selected for the location "b".

The dither coefficients (3, 1, −1 and −3) of (C) of FIG. 20 are then selected for the dot 302 on the second line and the first column at the gradation level 33. The dither coefficient −1 is selected for the location "c".

The dither coefficients (2, 1, −1 and −2) shown in (D) of FIG. 20 are finally selected for the dot 302 on the second line and the second column at the gradation level 57. The dither coefficient −2 is selected for the location "d".

As explained, the dither coefficients (5, 2, −1 and −2) are selected by the dither coefficients selector 33.

Figure 22:
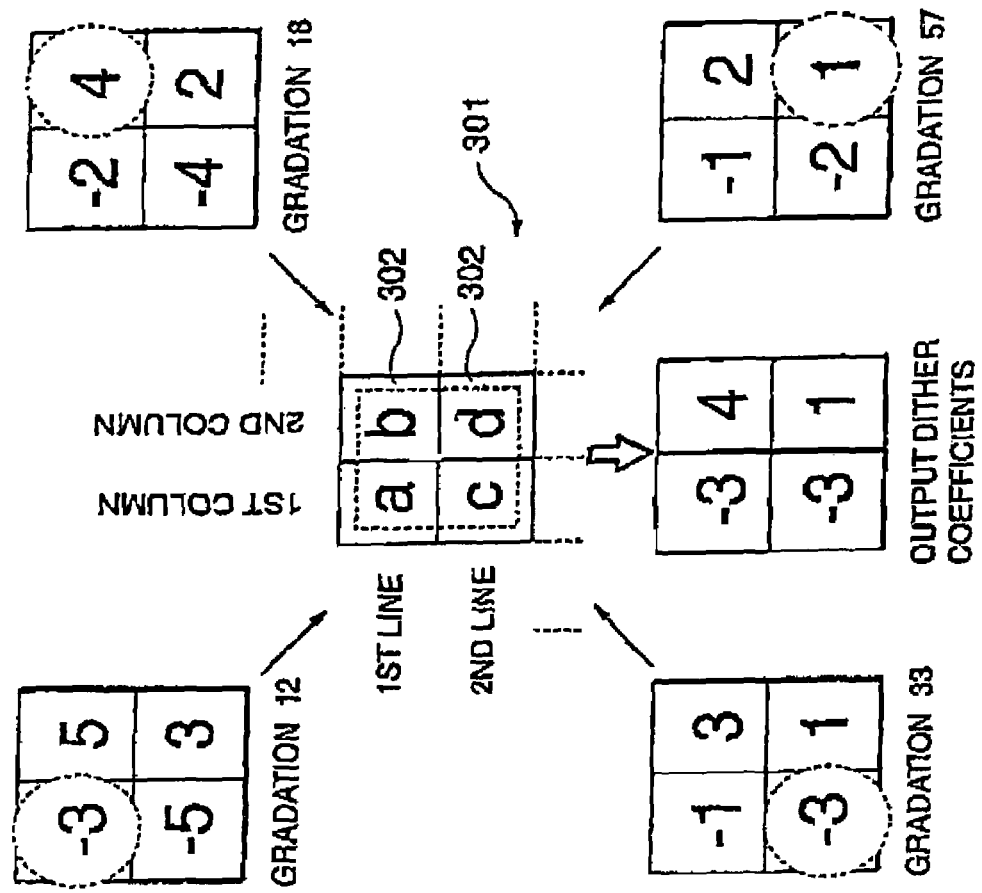
FIG. 22 illustrates selection of dither coefficients in the third embodiment.

Illustrated in FIG. 22 is selection of dither coefficients executed by the dither coefficients selector 33 using the dither coefficients patterns (−3, 5, −5 and 3), (−2, 4, −4 and 2), (−1, 3, −3 and 1) and (−1, 2, −2 and 1) shown in (A), (B), (C) and (D), respectively, of FIG. 20.

Furthermore, the dither coefficients selection shown in FIG. 22 is executed for the (2×2) dot matrices on the display panel 301 (FIG. 6) on the first line and the first column, the first line and the second column, the second line and the first column, and the second line and the second column, respectively.

Suppose that, in FIG. 22, the color gradations of the input video signal are also detected by the gradation detector 31 (FIG. 17) as levels 12, 18, 33 and 57 for the dot 302 on the first line and the first column, the first line and the second column, the second line and the first column, and the second line and the second column, respectively, on the display panel 301.

The dither coefficients (−3, 5, −5 and 3) shown in (A) of FIG. 20 are first selected for the dot 302 on the first line and the first column at the gradation level 12. Among them, the dither coefficient −3 is selected for the location "a".

The dither coefficients (−2, 4, −4 and 2) shown in (B) of FIG. 20 are also selected for the dot 302 on the first line and the second column at the gradation level 18. The dither coefficient 4 is then selected for the location "b".

The dither coefficients (−1, 3, −3 and 1) shown in (C) of FIG. 20 are then selected for the dot 302 on the second line and the first column at the gradation level 33. The dither coefficient −3 is selected for the location "c".

The dither coefficients (−1, 2, −2 and 1) shown in (D) of FIG. 20 are finally selected for the dot 302 on the second line and the second column at the gradation level 57. The dither coefficient 1 is selected for the location "d".

As explained, the dither coefficients (−3, 4, −3 and 1) are selected by the dither coefficients selector 33.

Although not described here, the same processing is executed when the dither coefficients (−5, −3, 3 and 5), (−4, −2, 2 and 4), (−3, −1, 1 and 3) and (−2, −1, 1 and 2) shown in (A), (B), (C) and (D), respectively, of FIG. 20 are selected. The dither coefficients (−5, −2, 1 and 2) are selected by the dither coefficients selector 33 the same as those described with reference to FIG. 21.

The same processing is also executed when the dither coefficients (3, −5, 5 and −3), (2, −4, 4 and −2), (1, −3, 3 and −1) and (1, −2, 2 and −1) shown in (A), (B), (C) and (D), respectively, of FIG. 20 are selected. The dither coefficients (3, −4, 3 and −1) are selected by the dither coefficients selector 33 the same as those described with reference to FIG. 21.

The same processing is also executed for the dither coefficients (1) and (2) shown in (A) of FIG. 19. The dither coefficients (5, 2, −1 and −2) are selected when the coefficients (1) shown in (A) of FIG. 19 are used. Furthermore, the dither coefficients (−5, −2, 1 and 2) are selected when the coefficients (2) shown in (A) to (D) of FIG. 19 are used.

Figure 23:
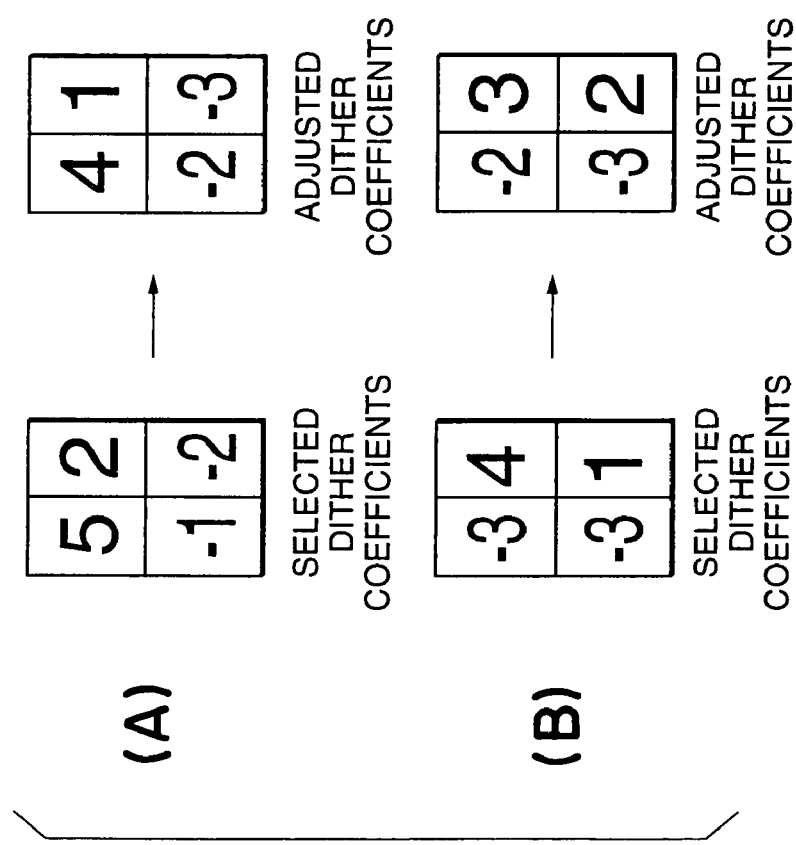
FIG. 23 illustrates adjustment of dither coefficients in the third embodiment.

Illustrated in (A) and (B) of FIG. 23 are adjustment of the dither coefficients selected as shown in FIGS. 21 and 22, respectively. The adjustment is executed by the dither coefficients adjuster 34 (FIG. 17) to generate dither coefficients which will be added to the input video signal for pictures of continuous gradation characteristics with less noises.

The dither coefficients adjuster 34 adjusts the dither coefficients pattern output from the dither coefficient selector 33 so that the sum total of the coefficients constituting the output dither pattern becomes zero. No processing is applied by the adjuster 34 to the coefficients of the output dither pattern if the sum total thereof is zero.

In (A) of FIG. 23, the dither coefficients pattern output from the dither coefficients selector 33 is (5, 2, −1 and −2) and the sum total is not zero but 4 because the sum of the positive coefficients is 7 and that of the negative coefficients is −3.

The dither coefficients adjuster 34 then resets the sum 7 of the positive coefficients to 5, and the sum −3 of the negative coefficients to −5 and adjusts the dither coefficients (5, 2, −1 and −2) to (4, 1, −2 and −3).

In (B) of FIG. 23, the dither coefficients pattern output from the dither coefficients selector 33 is (−3, 4, −3 and 1) and the sum total is not zero but −1 because the sum of the positive coefficients is 5 and that of the negative coefficients is −6.

The dither coefficients adjuster 34 then resets only the sum −6 of the negative coefficients to −5 and adjusts the dither coefficients (−3, 4, −3 and 1) to (−2, 3, −3 and 2).

The adjustment is preferably made so that there is no big difference between the dither coefficients before and after the adjustment.

The adjusted dither coefficients shown in (A) and (B) of FIG. 23 consist of an even number of the coefficients. Addition of the coefficients in each of two groups yields zero when the coefficients are divided into the two groups, both including the same number of the coefficients.

In detail, the adjusted dither coefficients (4, 1, −2 and −3) shown in (A) of FIG. 23 consists of four coefficients. The coefficients can be divided into two groups, such as, (4, 1) and (−2, −3); (4, −2) and (1, −3); and (4, −3) and (−2, 1).

For the first two groups, 4+1=5, −2+(−3)=−5, thus, 5+(−5)=0. The same calculations can be applied to the other groups.

The adjusted dither coefficients (−2, 3, −3 and 2) shown in (B) of FIG. 23 also consist of four coefficients. The coefficients can be divided into two groups, such as, (−2, 3) and (−3, 2); (−2, −3) and (3, 2); and (−2, 2) and (−3, 3).

The calculations described above can also be applied to these groups. Furthermore, the adjustment shown in (B) is preferable than (A) of FIG. 23. This is because the addition of the coefficients in the groups (−2, 2) and (−3, 3) made in the diagonal direction of the matrix yields zero in each group.

When the dither coefficients (−5, −3, 3 and 5), (−4, −2, 2 and 4), (−3, −1, 1 and 3) and (−2, −1, 1 and 2) shown in (A), (B), (C) and (D), respectively, of FIG. 20 are generated by the dither coefficients generator 32, the dither coefficients (−5, −2, 1 and 2) are finally selected by the dither coefficient selector 33 the same as those described with reference to FIGS. 21 and 22.

Furthermore, when the dither coefficients (3, −5, 5 and −3), (2, −4, 4 and −2), (1, −3, 3 and −1) and (1, −2, 2 and −1) shown in (A), (B), (C) and (D), respectively, of FIG. 20 are generated by the dither coefficients generator 32, the dither coefficients (3, −4, 3 and −1) are finally selected by the dither coefficient selector 33 the same as those described with reference to FIGS. 21 and 22.

The dither coefficients (−5, −2, 1 and 2) and (3, −4, 3 and −1) may be adjusted by the dither coefficients adjuster 34 to (−4, −1, 2 and 3) and (2, −3, 3 and −2), respectively.

The same processing is executed for the dither coefficients (1) and (2) shown in (A) to (D) of FIG. 19. When the coefficients (1) shown in (A) to (D) of FIG. 19 are used, the dither coefficients adjuster 34 outputs (4, 1, −2 and −3). When the coefficients (2) shown in (A) to (D) of FIG. 19 are used, the dither coefficients adjuster 34 outputs (−4, −1, 2 and 3).

Figure 24:
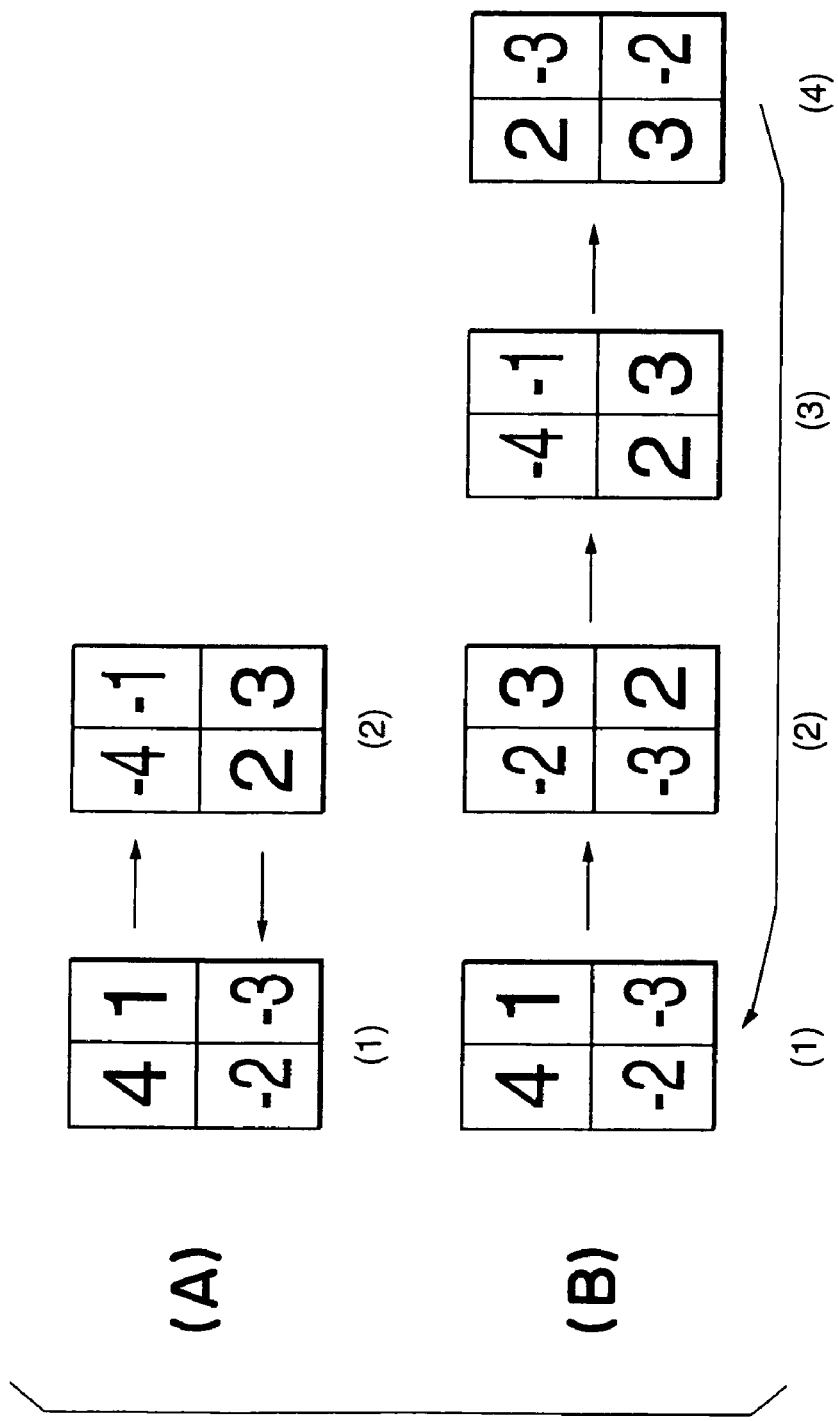
FIG. 24 illustrates dither coefficients adjusted as shown in FIG. 23.

Illustrated in FIG. 24 are dither coefficients patterns which are adjusted by the dither coefficients adjuster 34 (FIG. 17) and added to the input video signal in accordance with dot data supplied to dot data 302 on the display panel 301 (FIG. 6) of the PDP 300.

In (A) of FIG. 24, the dither coefficients (4, 1, 4, 1, . . . ) and (−2, −3, −2, −3, . . . ) are added to the video signal for the dot data on each odd and even line, respectively, on the display panel 301 beginning from the leftmost dot 302.

Furthermore, in (A) of FIG. 24, the dither coefficients (−4, −1, −4, −1, . . . ) and (2, 3, 2, 3, . . . ) are added to the video signal for the dot data on each odd and even line, respectively, on the display panel 301 beginning from the leftmost dot 302.

The dither coefficients patterns (1) and (2) shown in (A) of FIG. 24 are switched for each field according to the switching data supplied to the dither coefficients adjuster 34.

The same addition processing is executed for the dither coefficients patterns (1) to (4) shown in (B) of FIG. 24. These four types of dither coefficients patterns are also cyclically switched for each field according to the switching data supplied to the dither coefficients adjuster 34.

Cyclic switching of dither coefficients patterns as described above will generate less noises such as pseudo edges on pictures when the patterns are added to a video signal.

There are dither coefficients patterns other than those shown in FIG. 24, which are preferable in the third embodiment. Preferable dither coefficients patterns may be, for example, (−1, 0, 1 and 0) including 0, and (5, 3, −2 and −6) or (6, −2, −3 and −1) including no same absolute value. The dither coefficients patterns may not consist of the same number of positive and negative coefficients.

For (2×2) dot matrices, the best dither coefficients pattern is, for example, (−2, 3, −3 and 2) shown in (B) of FIG. 23 for achieving continuous color gradation characteristics and extremely less generation of pseudo edges on pictures on the border between adjacent matrices, where the sum total of the coefficients is zero, the number of positive and negative coefficients is the same, and the absolute value for the opposing dots in the diagonal direction is the same, for example,

|−2|=|2|=2 and |−3|=|3|=3, as shown in (B) of FIG. 23 (adjusted dither coefficients)

Figure 25:
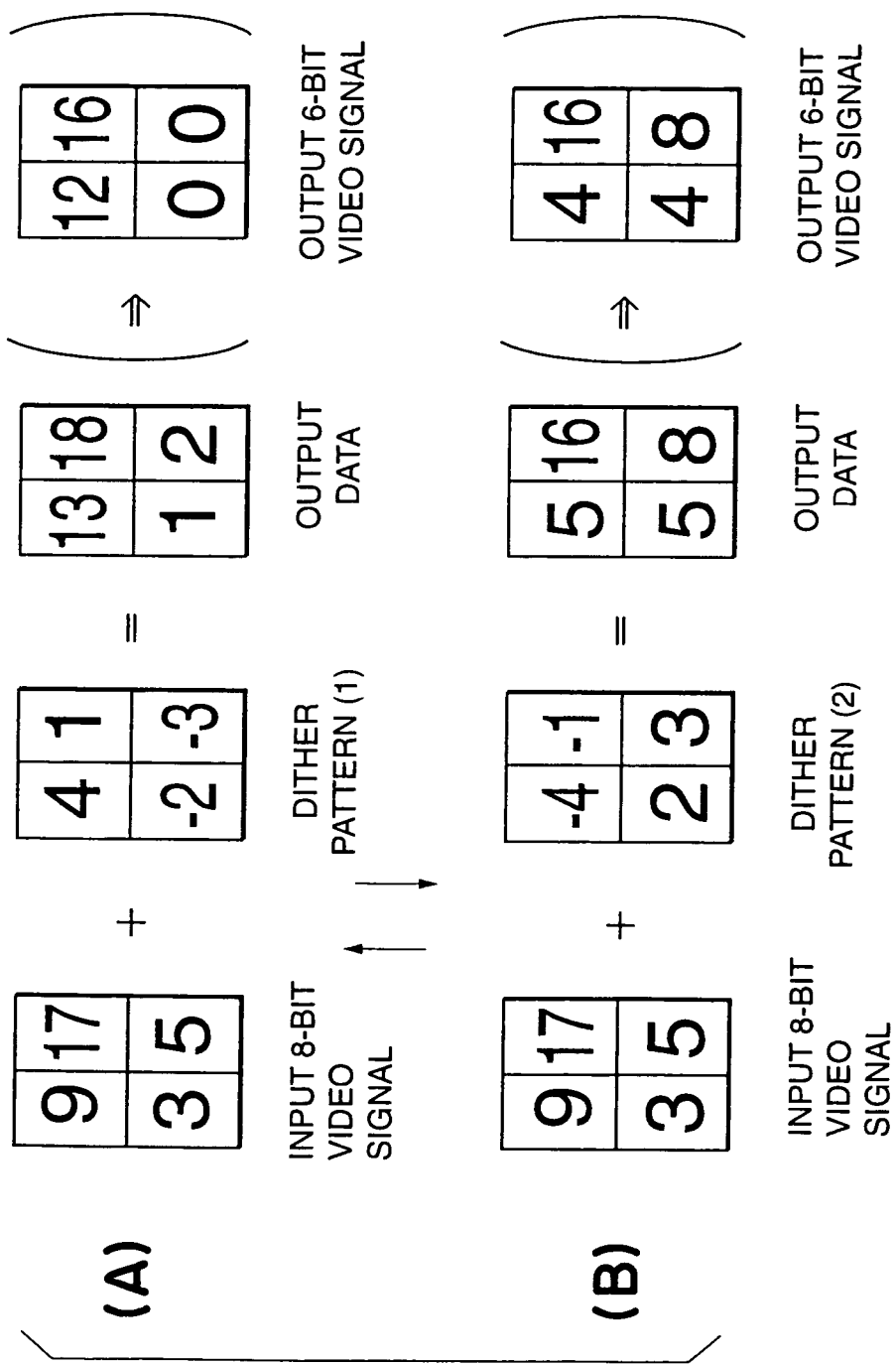
FIG. 25 illustrates processing by the video signal processor shown in FIG. 17.

Illustrated in (A) and (B) of FIG. 25 are processing executed by the video signal processor shown in FIG. 17 using the dither coefficients patterns (1) and (2), respectively, of FIG. 24, where two video signal components with the same data (9, 17, 3 and 5) are input for two successive fields.

In (A) of FIG. 25, the dither coefficients pattern (4, 1, −2 and −3) is added to an input 8-bit video signal by the adder 35 to obtain data (13, 18, 1 and 2).

The data (13, 18, 1 and 2) might exceed the 8-bit data (9, 17, 3 and 5). The values of the (13, 18, 1 and 2) which overflow or underflow the values (9, 17, 3 and 5) are limited by the limiter 36. The values of low two bits may also be dropped by the limiter 36 for a 6-bit PDP to obtain a 6-bit output video signal of data (12, 16, 0 and 0). Each data is also expressed with a multiple of four. The actual data for the 6-birt output video signal are (3, 4, 0 and 0).

In (B) of FIG. 25, the dither coefficients pattern (−4, −1, 2 and 3) is added to the input 8-bit video signal by the adder 35 (FIG. 17) to obtain data (5, 16, 5 and 8).

The data (5, 16, 5 and 8) might exceed the 8-bit data (9, 17, 3 and 5). The values of the (5, 16, 5 and 8) which overflow or underflow the values (9, 17, 3 and 5) are limited by the limiter 36.

The output video signals shown in (A) and (B) of FIG. 25 are switched for each field according to the switching data supplied to the dither coefficients adjuster 34.

Video signal processing using the dither patterns (1) to (4) shown in (B) of FIG. 24 are basically the same as those discussed above with reference to FIG. 25. The dither patterns (1) to (4) are switched cyclically for each field achieves multi-gradation spatially more continuous than those achieved by the dither patterns (1) and (2) shown in (A) of FIG. 24.

As disclosed above, the third embodiment divides the color gradations into a plurality of groups, and adjusts a dither coefficients pattern preferable for each gradation group to another dither pattern having new coefficients which is then added to an input video signal, thus achieving more effective gradation adjustments than the first and second embodiments.

Furthermore, as shown in FIG. 20, the dither coefficients patterns are added to the input video signal for the low-luminance level regions (gradation levels 63 or under) where gradations would otherwise be degraded due to reverse-gamma correction, thus achieving extremely less increase in the overall gradation of the output signal and providing pictures with almost the same gradation as those of the input video signal. The gradation adjustments are more effective by making larger the weightings (absolute values) for the dither coefficients as the gradations become smaller, as shown in FIG. 20.

Each dither coefficients pattern in the third embodiment consists of positive and negative coefficients for each dot 302 (FIG. 6) in the direction of time, the sum total of which is zero, thus addition of these patterns to an input video signal will not promote increase in the overall color gradation.

The processing illustrated in FIGS. 21 and 22 are for the dots 302 where there are big differences in level of adjacent gradations, such as, the levels 12, 18, 33 and 57. However, for dots where there are not so big differences in level of adjacent gradations and which are in the gradation groups shown in FIG. 18, the dither coefficients patterns decided as shown in FIGS. 21 and 22 become the same as shown in FIG. 18.

The dither coefficients patterns shown in FIG. 18 are set so that the sum total of the coefficients in each pattern is zero, thus the sum total of the dither coefficients which are actually added to a video signal is also zero. Extremely less noises will thus be generated on pictures when the dither coefficients shown in FIG. 18 are added to a video signal where color gradations for the dots 302 (FIG. 6) are in the gradation groups shown in FIG. 18.

Not only for each field, the dither coefficients patterns of the third embodiment can be switched for each frame or each pixel block. Furthermore, the dither coefficients patterns may be switched as time elapses or according to the locations on the display panel 301 (FIG. 6).

The dither coefficients patterns introduced in the third embodiment consist of the positive and negative coefficients for adjusting color gradations so that the number of gradation levels of an output video signal is the same as that of gradations of an input video signal. On the other hand, addition of the dither coefficients is executed only for achieving continuous gradation linearity.

The final dither coefficients patterns can be decided for display apparatus with low display performance, thus achieving continuous gradation linearity with apparent increase in the number of gradation levels.

Furthermore, not only to video signal components of gradation levels lower than a reference level, such as level 63 or under as shown in FIG. 18, the dither coefficients can be added to other video signal components of intermediate or high gradation levels or all the gradation levels, depending on qualities of pictures to be displayed. For covering any gradation levels, setting the weighting (absolute values) larger for the dither coefficients as gradation levels become smaller is the best. However, not only this, weighting can be varied and dither coefficients patterns can be optimized depending on the gradation characteristics of a matrix display apparatus.

The dither coefficients patterns introduced in the third embodiment consist of an even number of coefficients of (2×2) dot matrix. Not only this, however, dither coefficients patterns of an odd number of coefficients are also advantageous. The dither coefficients generator 32 (FIG. 17) may generate dither coefficients patterns of an odd number of coefficients like those as shown in FIG. 8. In response to such patterns of an odd number of coefficients via the dither coefficients selector 33, the dither coefficients adjuster 34 may generate dither coefficients patterns of an odd number of coefficients which will be added to an input video signal. Extremely less noises such as pseudo edges will thus be generated on pictures.

As disclosed above, the present invention employs the dither coefficients patters where the sum total of the coefficients is zero. Addition of such dither coefficients patterns to an input video signal will not increase gradations of color for an output video signal in the direction of time.

The present invention therefore achieves smooth and continuous color gradation characteristics with less visual luminance difference between adjacent gradation of color. The present invention thus provides high quality pictures with extremely less pseudo edges which would otherwise be generated due to sub-field division.

Furthermore, according to the present invention, color gradations of an input video signal are divided into a plurality of gradation groups and dither coefficients patterns appropriate to the gradation groups are added to an video signal, thus achieving an effective adjustment to all the gradations.

Moreover, according to the present invention, the dither coefficients patterns are added to an input video signal for the low-luminance level regions where gradations would otherwise be degraded due to reverse-gamma correction, thus achieving extremely less increase in the overall gradation of the output video signal, and providing pictures with almost the same gradation as those of the input video signal.

Furthermore, according to the present invention, the color gradations are divided into a plurality of groups, and a dither coefficients pattern preferable for each gradation group is adjusted to another dither pattern having new coefficients which is then added to an input video signal, thus achieving effective gradation adjustments.

What is claimed is:

1. An apparatus for processing a video signal comprising:
   a detector to detect color gradation levels of an input video signal;
   a generator to generate a plurality of dither coefficient signals, each coefficient signal carrying dither coefficients arranged in a matrix, weighting being applied to each dither coefficient for components of the input video signal, the components having gradation levels equal to or lower than a predetermined level, the gradation levels being divided into low to high gradation groups in the order of level of the gradation, in which the weighting to be applied is constant in each gradation group whereas larger for lower gradation groups; and
   an adder to add one of the coefficient signals to the components of the input video signal, thus outputting a video signal, wherein each coefficient signal carrying positive and negative coefficients arranged in an (n×m) matrix where "n" and "m" being positive integers larger than zero, the sum total of the coefficients being zero.

2. An apparatus for processing a video signal comprising:
   a detector to detect a color gradation level of each of a plurality of pieces of dot data arranged in an (n×m) matrix pattern, n and m being a positive integer larger than zero, and the dot data being carried by an input video signal, the (n×m) matrix pattern corresponding to a part of a plurality of pixels in a matrix display panel;
   a generator to generate a plurality of first dither coefficients pattern signals each being selected from a plurality of predetermined dither coefficients pattern signals in accordance with the detected color gradation level of each dot data of the (n×m) matrix pattern, each generated first dither coefficients pattern signal carrying dither coefficients arranged in the (n×m) matrix pattern, weighting being applied to each dither coefficient for components of the input video signal, the components having gradation levels equal to or lower than a predetermined level, the gradation levels being divided into low to high gradation groups in the order of level of the gradation, in which the weighting to be applied is constant in each gradation group whereas larger for lower gradation groups;

a selector to select one of the dither coefficients from each generated first dither coefficients pattern signal, each dither coefficient thus selected corresponding, in position, to each dot data in the (n×m) matrix pattern, and to combine dither coefficients thus selected from all of the generated first dither coefficients pattern signals, thus producing a second dither coefficients pattern signal carrying the selected and combined dither coefficients arranged in the (n×m) matrix pattern;

an adjuster to adjust the dither coefficients of the second dither coefficients pattern signal so that the sum total of the dither coefficients of the second dither coefficients pattern signal is zero, thus producing a third dither coefficients pattern signal carrying the adjusted dither coefficients; and an adder to add the third dither coefficient-adjusted pattern signal to the input video signal, thus outputting a video signal carrying the dot data to be supplied to the display panel.

3. The apparatus according to claim 2 wherein the selector selects one dither coefficient for each predetermined unit of the dot data carried by the video signal or according to locations of the pixels on the display panel.

4. The apparatus according to claim 2, wherein each pattern signal carries an even number of the coefficients, addition of the coefficients in each of two group yielding zero when the coefficients are divided into the two groups, both groups including the same number of the coefficients.

5. The apparatus according to claim 2, wherein each pattern signal carries an odd number of the coefficients, the coefficient located at the center of the matrix pattern being zero.

6. The apparatus according to claim 2, wherein "n" and "m" are equal to each other.

7. The apparatus according to claim 2, wherein each pattern signal carries the same number of the positive and the negative coefficients.

8. A method of processing a video signal comprising the steps of:

detecting a color gradation level of each of a plurality of pieces of dot data arranged in an (n×m) matrix pattern, n and m being positive integer larger than zero, and the dot data being carried by an input video signal, the (n×m) matrix pattern corresponding to a part of a plurality of pixels in a matrix display panel;

generating a plurality of first dither coefficients pattern signals each being selected from a plurality of predetermined dither coefficients pattern signals in accordance with the detected color gradation level of each dot data of the (n×m) matrix pattern, each generated first dither coefficients pattern signal carrying dither coefficients arranged in the (n×m) matrix pattern, weighting being applied to each dither coefficient for components of the input video signal, the components having gradation levels equal to or lower than a predetermined level, the gradation levels being divided into low to high gradation groups in the order of level of the gradation, in which the weighting to be applied is constant in each gradation group whereas larger for lower gradation groups;

selecting one of the dither coefficients from each generated first dither coefficients pattern signal, each dither coefficient thus selected corresponding, in position, to each dot data in the (n×m) matrix pattern, and combining dither coefficients thus selected from all of the generated first dither coefficients pattern signals, thus producing a second dither coefficients pattern signal carrying the selected and combined dither coefficients arranged in the (n×m) matrix pattern;

adjusting the dither coefficients of the second dither coefficients pattern signal so that the sum total of the dither coefficients of the second dither coefficients pattern signal is zero, thus producing a third dither coefficients pattern signal carrying the adjusted dither coefficients; and adding the third dither coefficient-adjusted pattern signal to the input video signal, thus outputting a video signal carrying the dot data to be supplied to the display panel.

9. The method according to claim 8 wherein the selection step comprises the step of selecting one dither coefficient for each predetermined unit of the dot data carried by the video signal or according to locations of the pixels on the display panel.

10. The method according to claim 8, wherein the first dither coefficients pattern signals are generated so that each pattern signal carries an even number of the coefficients, addition of the coefficients in each of two group yielding zero when the coefficients are divided into the two groups, both groups including the same number of the coefficients.

11. The method according to claim 8, wherein the first dither coefficients pattern signals are generated so that each pattern signal carries an odd number of the coefficients, the coefficient located at the center of the matrix pattern being zero.

* * * * *